United States Patent
Zhang et al.

(10) Patent No.: US 10,277,415 B2
(45) Date of Patent: Apr. 30, 2019

(54) MBMS BEARER ENHANCEMENTS FOR PUSH TO TALK OR PUSH TO EVERYTHING VIA EMBMS

(71) Applicants: Xiaoxia Zhang, San Diego, CA (US); Jun Wang, San Diego, CA (US); Xipeng Zhu, Beijing (CN); Nagaraju Naik, San Diego, CA (US); QUALCOMM Incorporated, San Diego, CA (US)

(72) Inventors: Xiaoxia Zhang, San Diego, CA (US); Jun Wang, San Diego, CA (US); Xipeng Zhu, Beijing (CN); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 14/785,292

(22) PCT Filed: Apr. 18, 2013

(86) PCT No.: PCT/CN2013/074360
§ 371 (c)(1),
(2) Date: Oct. 16, 2015

(87) PCT Pub. No.: WO2014/169461
PCT Pub. Date: Oct. 23, 2014

(65) Prior Publication Data
US 2016/0087810 A1    Mar. 24, 2016

(51) Int. Cl.
*H04W 4/06* (2009.01)
*H04L 12/18* (2006.01)
(Continued)

(52) U.S. Cl.
CPC .......... *H04L 12/189* (2013.01); *H04L 63/065* (2013.01); *H04L 65/1006* (2013.01);
(Continued)

(58) Field of Classification Search
None
See application file for complete search history.

(56) References Cited

U.S. PATENT DOCUMENTS

| | | | |
|---|---|---|---|
| 6,876,636 B2 | 4/2005 | Sinnarajah et al. | |
| 7,643,817 B2 * | 1/2010 | Klug | H04L 63/0442 455/411 |

(Continued)

FOREIGN PATENT DOCUMENTS

| | | |
|---|---|---|
| CN | 1518243 A | 8/2004 |
| CN | 1770916 A | 5/2006 |

(Continued)

OTHER PUBLICATIONS

Samsung: "MBMS Notification Solution Using PICH", 3GPP TSG RAN WG2 adhoc_2003_05_MBMS R2-030914, May 16, 2003, 5 Pages, URL: http://www.3gpp.org/ftp/tsg_ran/WG2_RL2/TSGR2_AHs/2003_05_MBMS/Tdocs/R2_only/R2-030914.zip.

(Continued)

*Primary Examiner* — Sithu Ko
(74) *Attorney, Agent, or Firm* — Muncy, Geissler, Olds & Lowe, P.C.

(57) ABSTRACT

A method, an apparatus, and a computer program product for wireless communication are provided. The apparatus may be a UE that performs a PTT/PTX call setup for communication via MBMS. In a first configuration, the UE sets up a unicast bearer with an eNB, and sends group call setup signaling to the eNB while setting up the unicast bearer. In a second configuration, the UE sets up a unicast bearer with an eNB, and receives group call setup signaling (Continued)

from the eNB while setting up the unicast bearer. In a third configuration, the UE receives a group page while in an RRC idle state, and receives group call setup signaling based on information in the group page.

26 Claims, 32 Drawing Sheets

(51) Int. Cl.
    *H04W 4/10*            (2009.01)
    *H04L 29/06*            (2006.01)
    *H04W 72/00*           (2009.01)
    *H04W 12/02*           (2009.01)
    *H04W 12/04*           (2009.01)

(52) U.S. Cl.
    CPC ............. *H04W 4/10* (2013.01); *H04W 12/02* (2013.01); *H04W 72/005* (2013.01); *H04L 2463/062* (2013.01); *H04W 12/04* (2013.01)

(56) References Cited

U.S. PATENT DOCUMENTS

| | | |
|---|---|---|
| 2002/0172165 A1 | 11/2002 | Rosen et al. |
| 2004/0152476 A1* | 8/2004 | Kuwano ............... H04W 68/00 455/459 |
| 2005/0041617 A1* | 2/2005 | Huotari .................. H04L 29/06 370/328 |
| 2006/0104225 A1* | 5/2006 | Kim ....................... H04L 12/189 370/313 |
| 2008/0247373 A1* | 10/2008 | Synnergren ........... H04L 12/189 370/340 |
| 2011/0149827 A1* | 6/2011 | Na ......................... H04L 12/189 370/312 |
| 2012/0170502 A1* | 7/2012 | Korus ..................... H04W 4/06 370/312 |

FOREIGN PATENT DOCUMENTS

| | | |
|---|---|---|
| CN | 1842065 A | 10/2006 |
| CN | 102036175 A | 4/2011 |
| CN | 102821358 A | 12/2012 |
| JP | 2010524326 A | 7/2010 |
| JP | 2013509800 A | 3/2013 |
| WO | 2002093953 | 11/2002 |
| WO | 04006615 | 1/2004 |
| WO | 2009035282 A2 | 3/2009 |
| WO | 2009121406 A1 | 10/2009 |
| WO | 2012092416 A1 | 7/2012 |
| WO | 2012166893 | 12/2012 |
| WO | 2012167841 A1 | 12/2012 |
| WO | 2013008990 A1 | 1/2013 |

OTHER PUBLICATIONS

Supplementary European Search Report—EP13882117—Search Authority—Munich—Oct. 21, 2016.
Vodaf0ne: "MBMS P2M Mode Solution Based on Counting Number of Channel Request Messages in the GSM Network—MBMS-000040," 3GPP TSG SA WG2 MBMS Drafting Meeting, XX, XX, May 6, 2002 (May 6, 2002), pp. 1-3, XP002275845.
International Search Report and Written Opinion—PCT/CN2013/074360—ISA/EPO—Jan. 30, 2014.

* cited by examiner

MBMS BEARER ENHANCEMENTS FOR PUSH TO TALK OR PUSH TO EVERYTHING VIA EMBMS

CROSS-REFERENCE TO RELATED APPLICATIONS

This application is the U.S. National Stage Entry under 35 U.S.C. § 371 of International Application No. PCT/CN2013/074360, filed on Apr. 18, 2013, which is incorporated herein in its entirety.

BACKGROUND

Field

The present disclosure relates generally to communication systems, and more particularly, to Multimedia Broadcast Multicast Service (MBMS) bearer enhancements for push to talk (PTT) or push to everything (PTX) via evolved MBMS (eMBMS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE. The UE performs a PTT/PTX call setup for communication via MBMS. The UE sets up a unicast bearer with an eNB. The UE sends group call setup signaling to the eNB while setting up the unicast bearer.

In an aspect of the disclosure, a method, a computer program product, and an apparatus are provided. The apparatus may be a UE. The UE performs a PTT/PTX call setup for communication via MBMS. The UE sets up a unicast bearer with an eNB. The UE receives group call setup signaling from the eNB while setting up the unicast bearer.

In an aspect of the disclosure, a method, a computer program product, and an apparatus are provided. The apparatus may be a UE. The UE performs a PTT/PTX call setup for communication via MBMS. The UE receives a group page while in a radio resource control idle state. The UE receives group call setup signaling based on information in the group page.

In an aspect of the disclosure, a method, a computer program product, and an apparatus are provided. The apparatus may be a network. The network performs a PTT/PTX call setup for communication via MBMS. The network sets up an MBMS session for PTT/PTX communication for an originating UE and target UEs. The network sends group call setup signaling to the originating UE and the target UEs.

DETAILED DESCRIPTION

Figure 1:
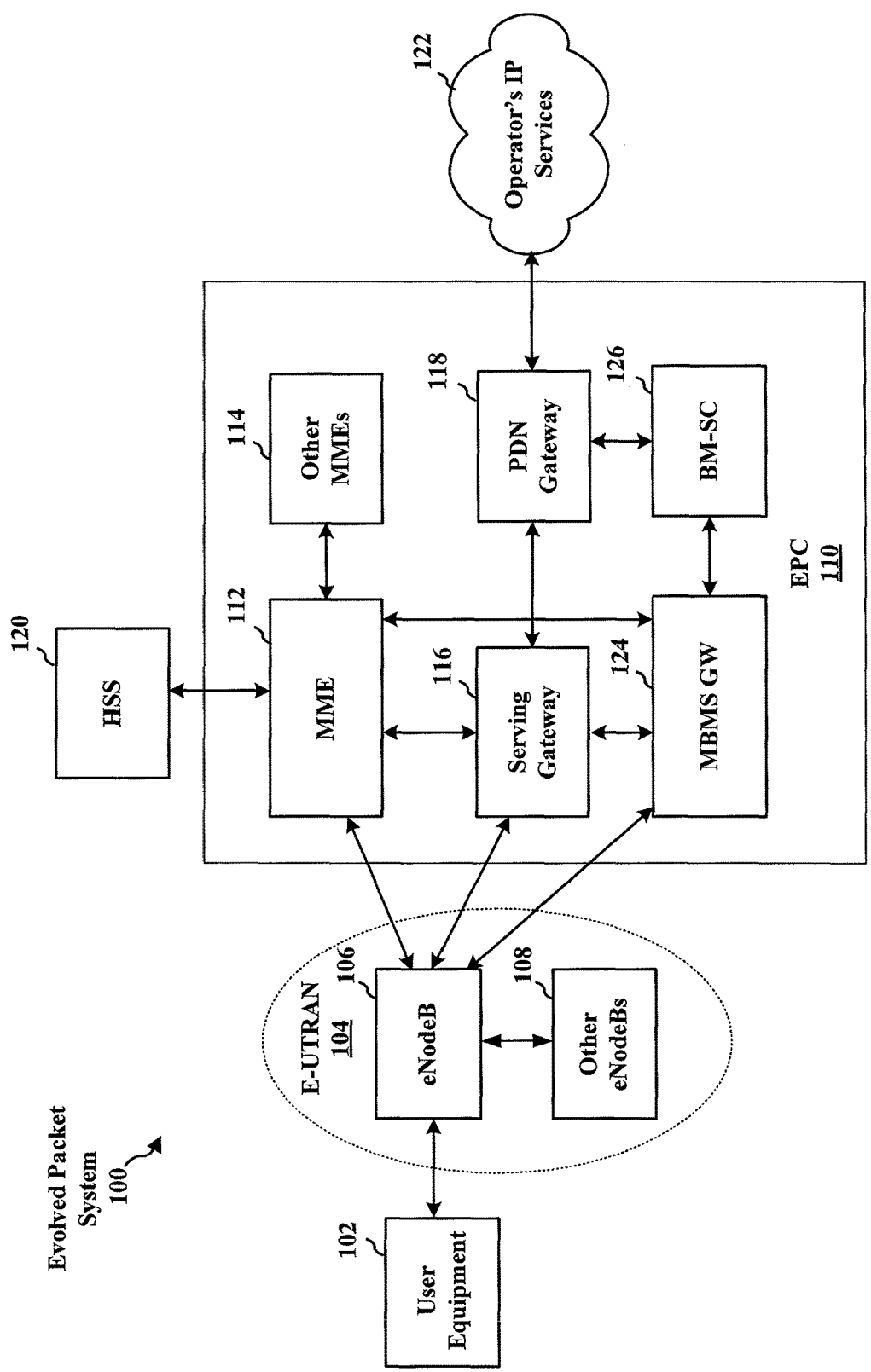
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
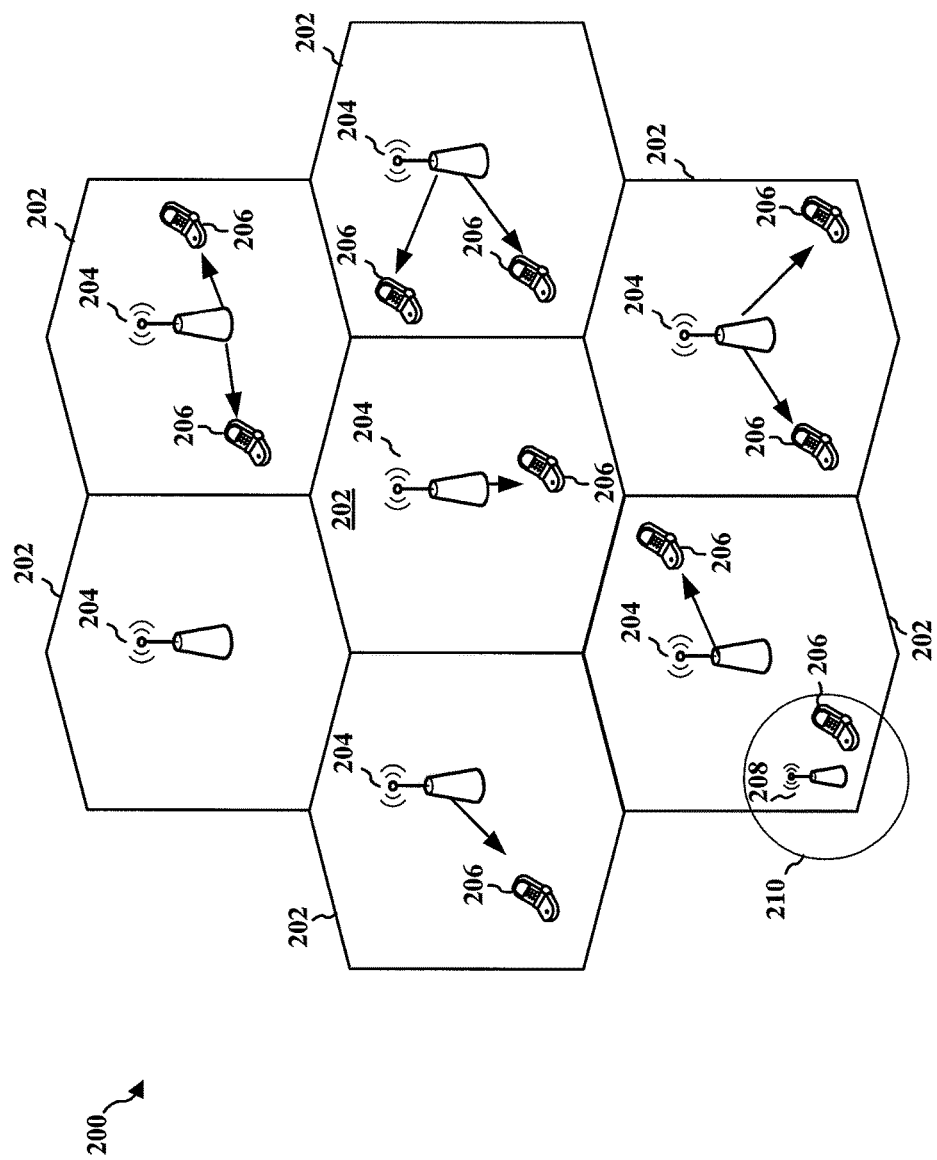
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
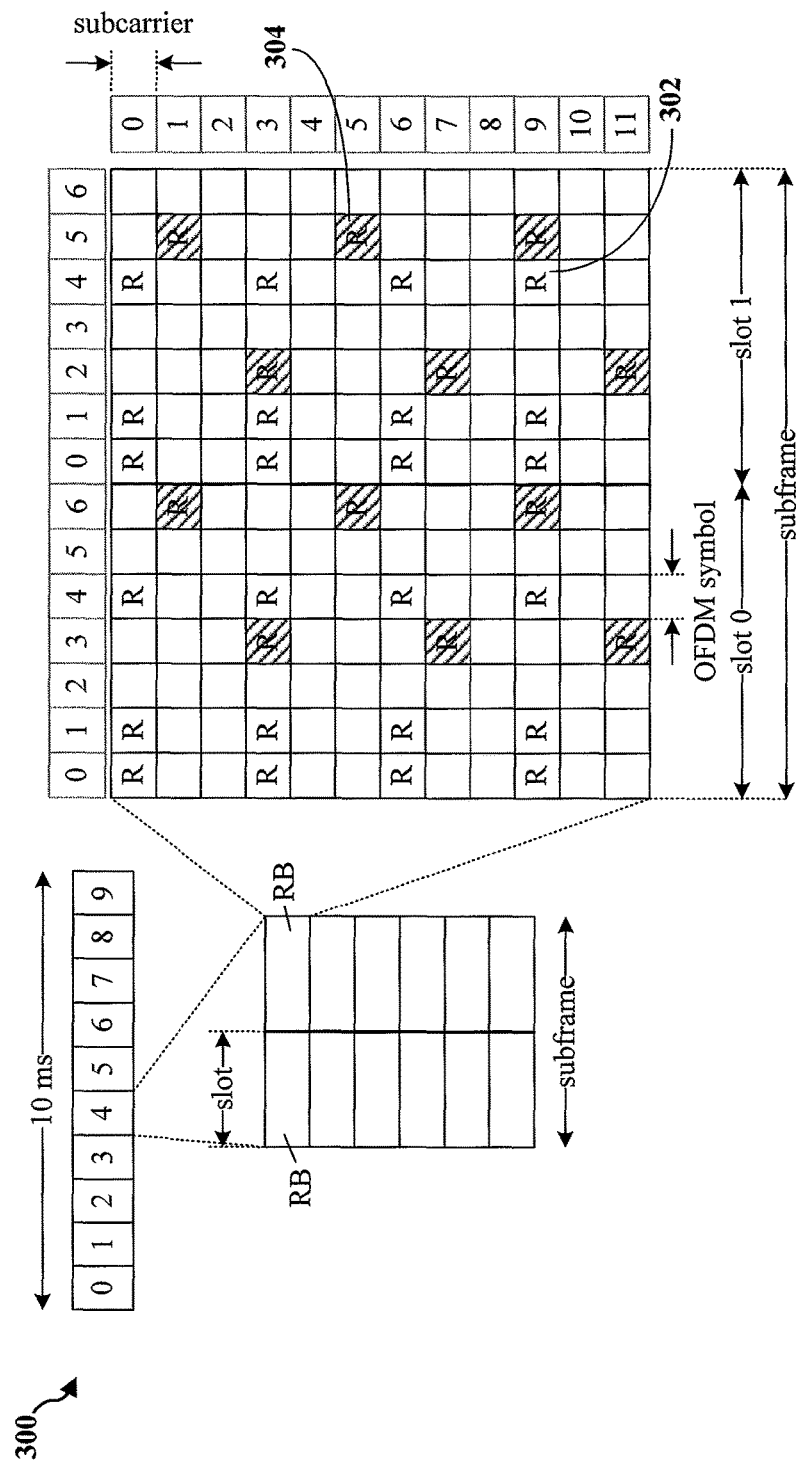
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
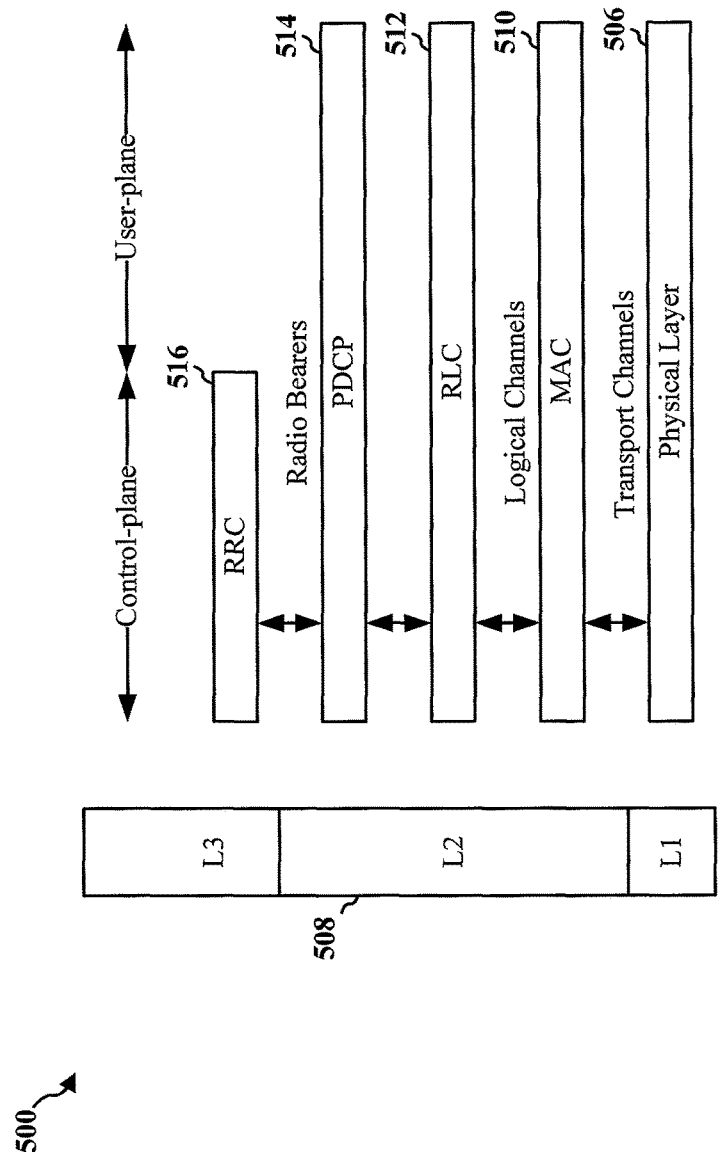
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
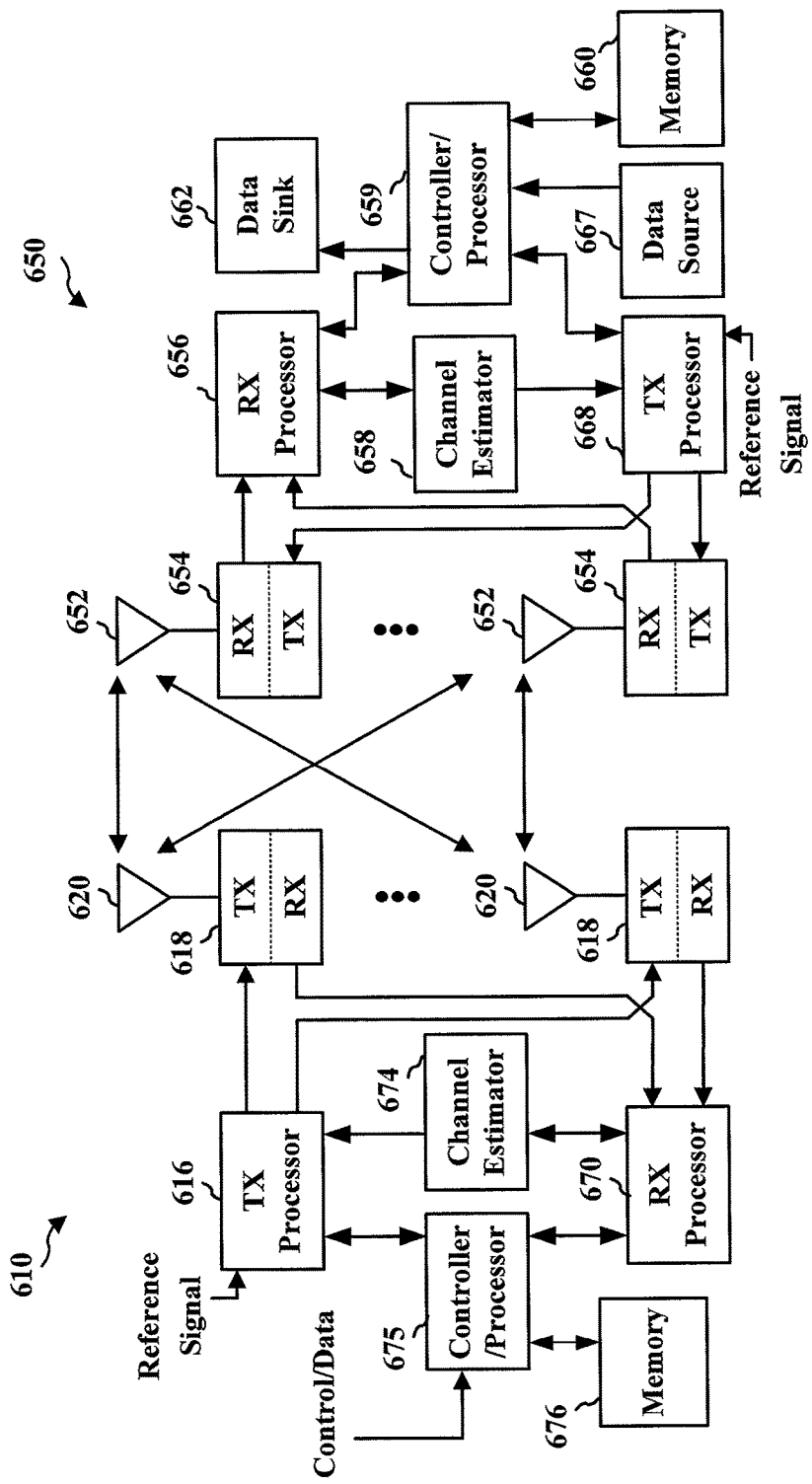
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
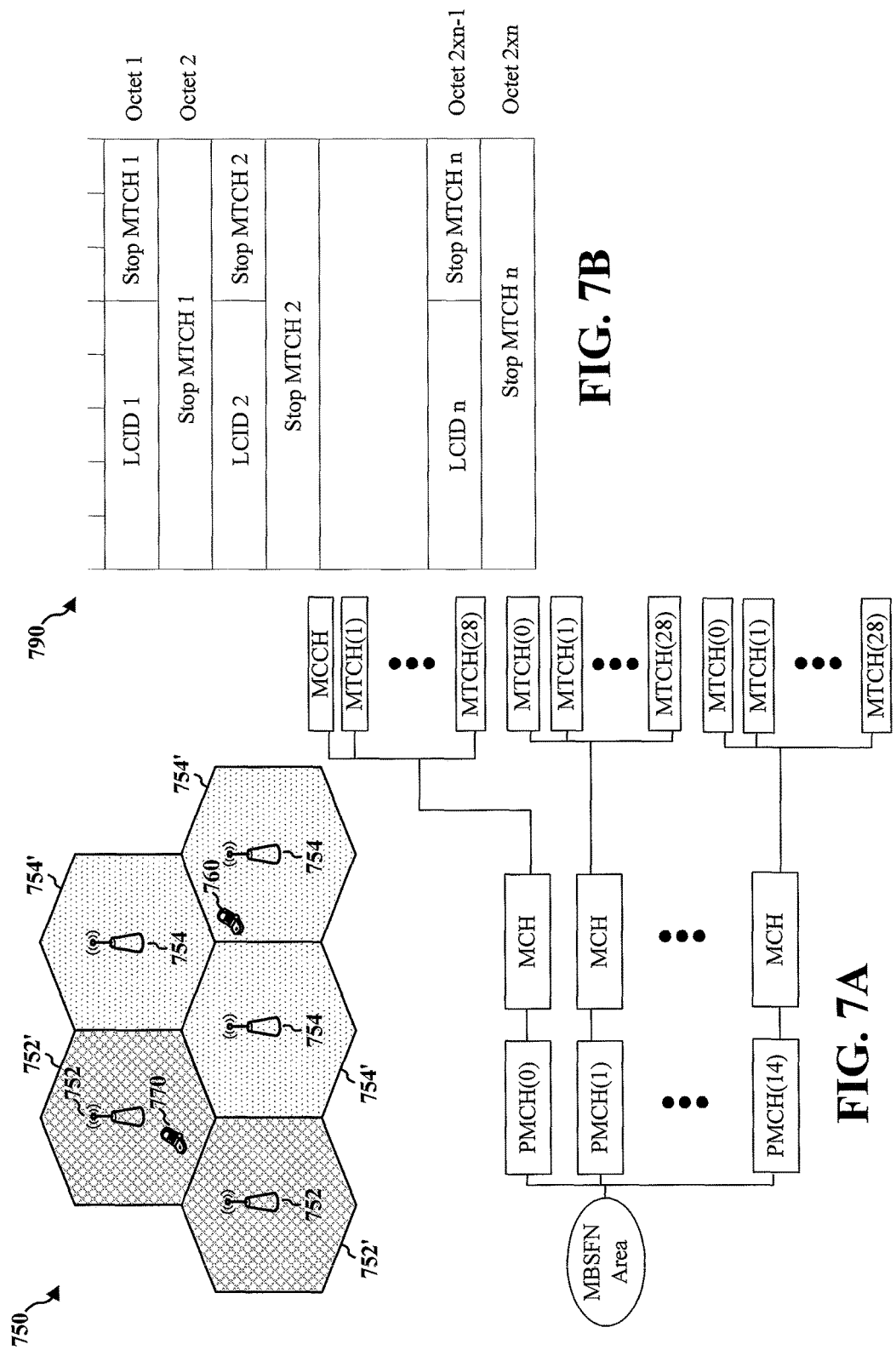
FIG. 7A is a diagram illustrating an example of an evolved MBMS (eMBMS) channel configuration in a Multicast Broadcast Single Frequency Network (MBSFN).
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 7C:
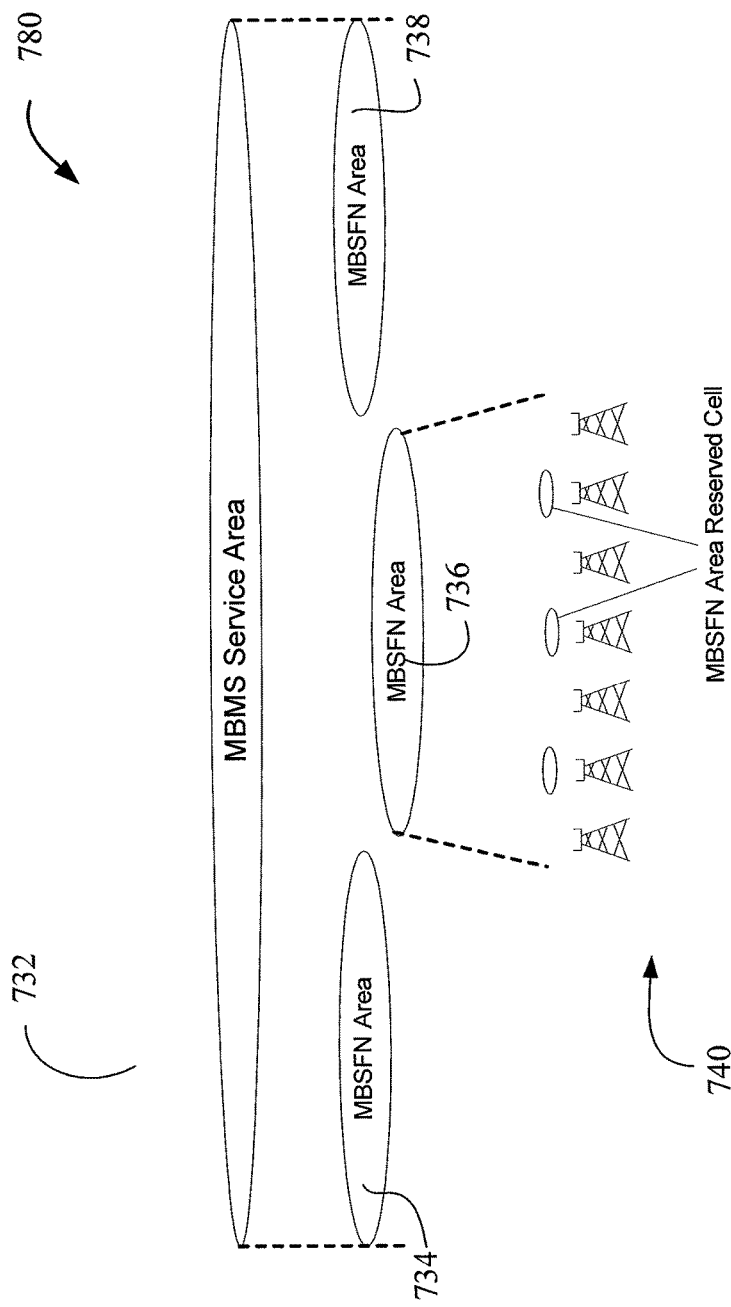
FIG. 7C is a diagram illustrating MBMS over MBSFN areas within an MBMS service area.

FIG. 7C is a diagram 780 illustrating MBMS over MBSFN areas within an MBMS service area. FIG. 7C illustrates a system including an MBMS service area 732 encompassing multiple MBSFN areas 734, 736, 738, which themselves include multiple cells or base stations 740. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 734, 736 and 738. As used herein, an MBSFN area refers to a group of cells (e.g., cells 740) currently broadcasting a particular program in a synchronized manner using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 732 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

With an increase in eMBMS popularity, adaptively configuring multicast broadcast service areas (e.g., MBSFN service areas, MBMS service areas) or MBSFN areas based on available resources and user distribution could be beneficial. Through the adaptive configuration of multicast broadcast service areas/MBSFN areas, cells may be added or removed according to actual needs. By allowing the adaptive configuration of multicast broadcast service areas/MBSFN areas, system resource utilization may be increased, easy of operations/configurations may be improved, interference may be reduced through the use of tiers, and eMBMS may be provided on demand when a sufficient number of users desire the same service.

Figure 8:
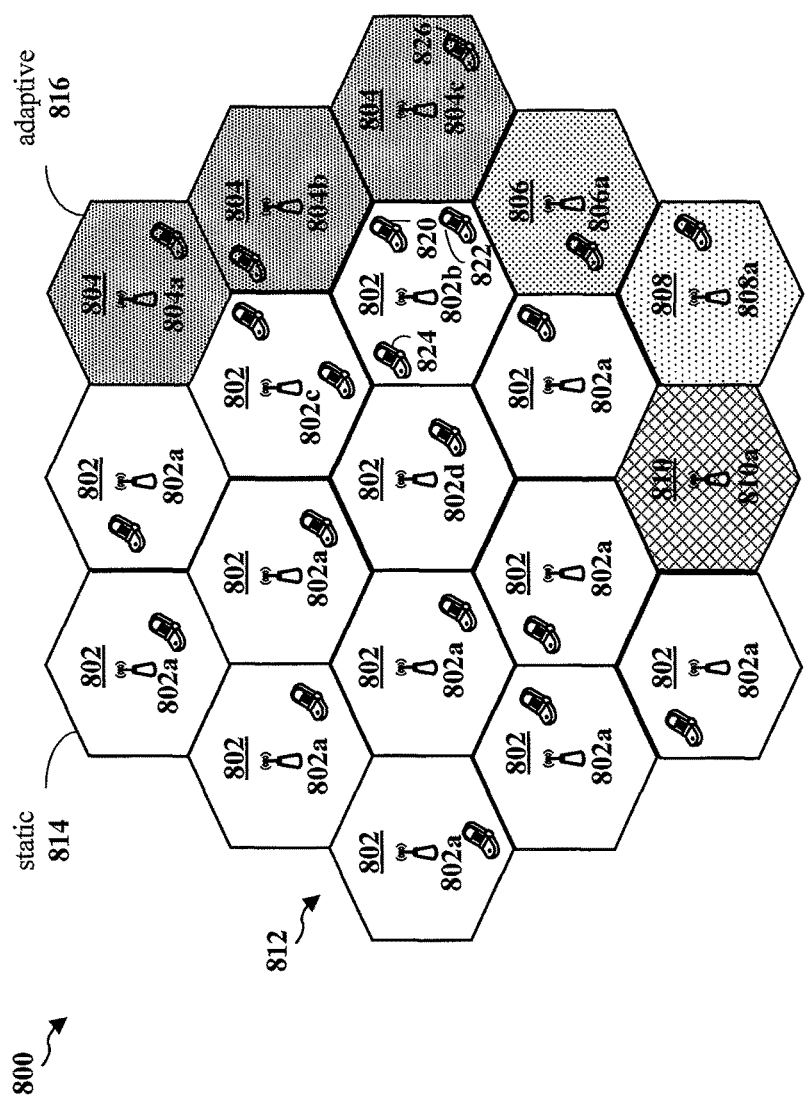
FIG. 8 is a diagram for illustrating an exemplary method for adaptively configuring multicast broadcast service areas/MBSFN areas.

FIG. 8 is a diagram 800 for illustrating an exemplary method for adaptively configuring multicast broadcast service areas/MBSFN areas. As shown in FIG. 8, a multicast broadcast service area 812 may include cells 802-810 corresponding to the eNBs 802a, 802b, 802c, 802d, 804a, 804b, 804c, 806a, 808a, and 810a. One or more of the eNBs within the multicast broadcast service area 812 may determine UE count information indicating a number of UEs served by the eNBs. Each of the one or more of the eNBs then sends the UE count information to a network entity, such as a Multicast Coordination Entity (MCE) or a BM-SC. Each of the one or more of the eNBs may also receive signal quality information from each of the UEs served by the corresponding eNB. The signal quality information is with respect to the serving base station and neighboring base stations. For example, the eNB 802b may receive signal quality information from each of the UEs 820, 822, 824. The signal quality information may be with respect to unicast transmissions and/or multicast/broadcast transmissions and may include at least one of reference signal received power (RSRP) information, reference signal received quality (RSRQ) information, a receive strength signal indicator (RSSI), or a signal to interference plus noise ratio (SINR). Accordingly, the eNB 802b may receive signal quality information from the UE 820 based on unicast and/or multicast/broadcast transmissions from the eNBs 802b, 804b, 804c; from the UE 822 based on unicast and/or multicast/broadcast transmissions from the eNBs 802b, 804c, 806a; and from the UE 824 based on unicast and/or multicast/broadcast transmissions from the eNBs 802b, 802c, 802d. Each of the one or more of the eNBs then sends the signal quality information to the network entity, such as the MCE or the BM-SC.

Based on the UE count information, the MCE or BM-SC determines whether a base station should be part of the multicast broadcast service area 812 and/or an MBSFN area within the multicast broadcast service area 812. The MCE or BM-SC may make the determination further based on the received signal quality information. For example, upon receiving the UE count information and signal quality information, the MCE or BM-SC may determine that the eNB 804c should be part of the multicast broadcast service area 812 and/or be a part of an MBSFN area within the multicast broadcast service area 812. The MCE or BM-SC may make such a determination based on providing MBSFN (MBMS) services for any UEs served by the eNB 804c, such as the UE 826, or based on providing improved (e.g., improved RSRP, RSRQ, RSSI, SINR) MBSFN services for any UEs on the cell edge of the eNB 804c, such as for the UEs 820, 822. Specifically, the MCE or BM-SC may determine based on the UE count information that a sufficient number of UEs within the coverage of the eNB 804c, such as the UE 826, would like to receive MBSFN services from the eNB 804c. Furthermore, the MCE or BM-SC may determine based on the UE count information that a sufficient number of UEs, such as the UEs 820, 822, reported a signal quality from the eNB 802b less than a first quality threshold and a signal quality from the eNB 804c greater than a second quality threshold. The MCE or BM-SC may then determine that the UEs 820, 822 are on the edge of the cells between the eNBs 802b, 804c, and may therefore benefit from receiving MBSFN services from the eNB 804c.

As shown in FIG. 8, the cells 802 (i.e., the set of cells 814) within the multicast broadcast service area 812 are statically configured and therefore the multicast broadcast service area configuration and the MBSFN area of each of the cells 802 may not be adapted or changed dynamically. However, the cells 804, 806, 808, 810 (i.e., the set of cells 816) within the multicast broadcast service area 812 are adaptively configured and therefore the multicast broadcast service area configuration and/or the MBSFN area of each of the cells 804, 806, 808, 810 may be adapted or changed dynamically. Upon receiving the UE count information and the signal quality information, the MCE or BM-SC may rank the adaptively configured eNBs 816 based on the UE count information and the signal quality information. For example, the MCE or BM-SC may rank an adaptively configured eNB higher if the adaptively configured eNB serves a sufficient number of UEs that would like to receive MBSFN services and/or would improve the signal quality of a sufficient number of UEs on a cell edge of the adaptively configured eNB. In one configuration, the eNBs within the multicast broadcast service area 812 perform the ranking and send ranked list information to the MCE or BM-SC. Based on the ranked adaptively configured eNBs 816, the MCE or BM-SC determines which eNBs should be part of the multicast broadcast service area 812 and/or part of particular MBSFN areas. The MCE or BM-SC then sends information to the eNBs indicating whether the eNBs should be part of the multicast broadcast service area 812 and/or particular MBSFN areas.

The MCE or BM-SC may also determine a broadcasting tier for the eNB upon determining the eNB should be part of the multicast broadcast service area 812 and/or particular MBSFN areas. The broadcasting tier may be a first tier (tier 1) 840 for broadcasting a system information block (SIB) indicating an MCCH configuration for the MCCH; a second tier (tier 2) 842 for broadcasting the SIB indicating the MCCH configuration for the MCCH and broadcasting the MCCH indicating an MTCH configuration; or a third tier (tier 3) 844 for broadcasting the SIB indicating the MCCH configuration for the MCCH, broadcasting the MCCH indicating the MTCH configuration, and broadcasting the MTCH. The tiers allow for particular adaptive eNBs to be configured to provide different levels of MBSFN services. For example, if an adaptive eNB serves many UEs interested in receiving MBSFN services or the broadcasting of the MTCH would improve cell edge UEs served by other eNBs, the adaptive eNB may be configured in tier 3. However, if the adaptive eNB serves few or no UEs and the broadcasting of the MTCH would provide no to little improvement to cell edge UEs served by other eNBs, the adaptive eNB may be configured in tier 2 or tier 1. As shown in FIG. 8, based on the UE count information and the signal quality information, the MCE or BM-SC determined that the eNBs 804a, 804b, 804c should provide tier 3 844 MBSFN services, the eNB 806a should provide tier 2 842 MBSFN services, the eNB 808a should provide tier 1 840 MBSFN services, and the eNB 810a should not be a part of the multicast broadcast service area 812 and/or provide MBSFN services (846). Upon determining the broadcasting tier for the eNBs, the MCE or BM-SC sends information to the eNBs indicating their MBSFN broadcasting tier.

When the MCE/BM-SC determines that an adaptive eNB should not be a part of the multicast broadcast service area 812, the multicast broadcast service area decreases in size. When the MCE/BM-SC determines that an adaptive eNB should be a part of the multicast broadcast service area 812, the multicast broadcast service area increases in size. As such, the determination of whether adaptive eNBs should be part of the multicast broadcast service area 812 ultimately changes the size of the multicast broadcast service area 812, usually on the edges of the multicast broadcast service area 812. As discussed supra, each multicast broadcast service area 812 may support up to eight MBSFN areas. When the MCE/BM-SC determines that an adaptive eNB should not be a part of an MBSFN area of the multicast broadcast service area 812, the multicast broadcast service area 812 may not change in size. Instead, the services provided by one of the cells in the multicast broadcast service area 812 changes. The adaptive multicast broadcast service area and adaptive MBSFN areas allow for areas associated with MBSFN/MBMS services to change based on UE mobility, UE multicast broadcast service interest, multicast broadcast reception quality improvement, etc.

Figure 9:
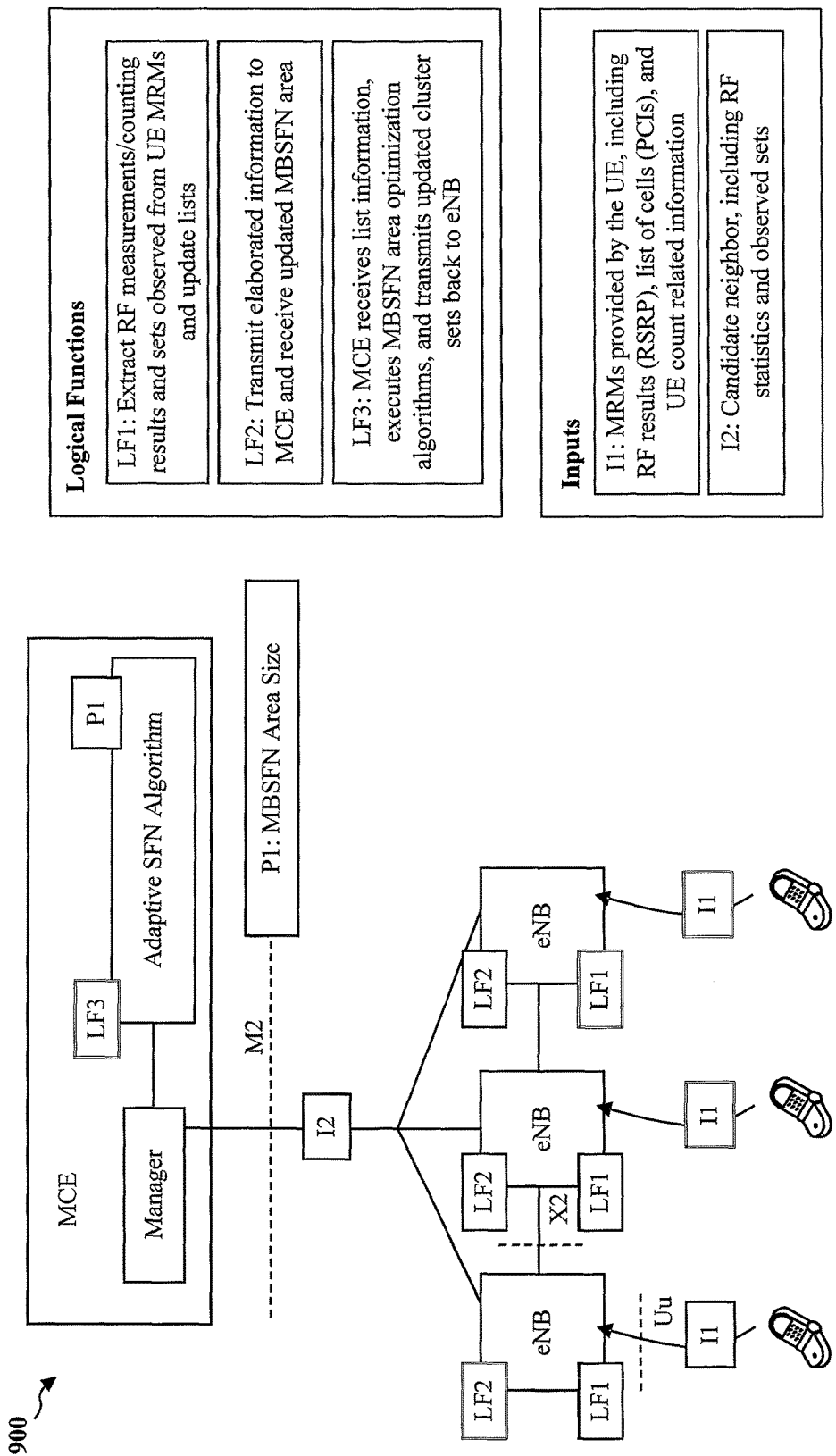
FIG. 9 is a diagram illustrating a first exemplary architecture for adaptively configuring multicast broadcast service areas/MBSFN areas.

FIG. 9 is a diagram 900 illustrating a first exemplary architecture for adaptively configuring multicast broadcast service areas/MBSFN areas. UEs are instructed by serving eNBs to measure and to report measurement report messages (MRMs) about the serving eNB and surrounding/neighboring eNBs. The UEs may also report on whether they would like to receive MBSFN services or particular MBSFN services. The UEs send the information within the input I1 to the eNBs. The input I1 includes MRMs and information for obtaining a count of UEs (i.e., UE count information) interested in MBSFN services or particular MBSFN services. The MRMs may include radio frequency (RF) results, such as RSRP, RSRQ, RSSI, or SINR measurements. The MRMs may further include a list of cells (e.g., physical cell identities (PCIs)). The eNBs receive the input I1 from the UEs.

In logical function LF1, the eNBs may extract RF measurements, obtain the list of cells, and determine a count of UEs (i.e., UE count information) that would like to receive MBSFN services or particular MBSFN services. The eNBs may then rank the list of cells. In the logical function LF2, the eNBs may transmit elaborated information to the MCE and receive an updated configuration for the multicast broadcast service area and/or MBSFN areas. The elaborated information may include the RF measurements, list of cells, and the UE count information. Alternatively or additionally, the elaborated information may include the ranked list of cells. The eNBs send input I2 to the MCE. The input I2 includes candidate neighbors, including RF statistics and observed sets. In logical function LF3, the MCE receives the list information, executes MBSFN area optimization algorithms to maximize a goal function for adjusting to the network load and MBMS user distribution, and transmits updated cluster sets (i.e., multicast broadcast service area and/or MBSFN area configurations) back to the eNBs indicating whether the eNBs should be part of the multicast broadcast service area and/or part of particular MBSFN areas.

Figure 10:
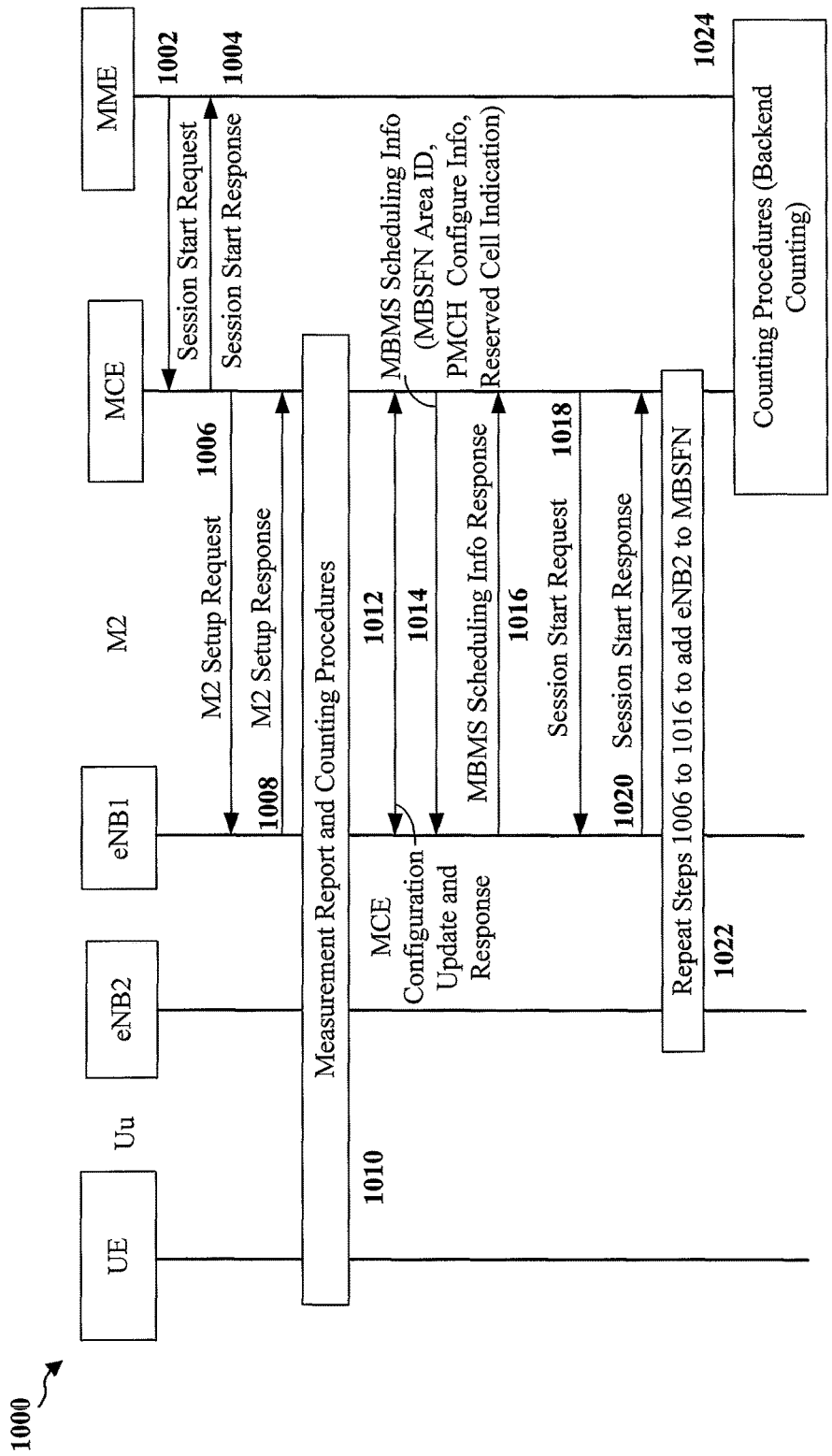
FIG. 10 is a diagram illustrating a first exemplary signaling design for an adaptive MBSFN.

FIG. 10 is a diagram 1000 illustrating a first exemplary signaling design for an adaptive MBSFN. As shown in FIG. 10, in step 1002, the MME sends a session start request to the MCE. In step 1004, the MCE responds by sending a session start response to the MME. In step 1006, the MCE sends an M2 interface setup request to the eNB1. In step 1008, the eNB1 responds by sending an M2 interface setup response to the MCE. In step 1010, in response to receiving the M2 setup request, the eNB1 obtains UE measurement reports and UE count information indicating a number of UEs served by the eNB1 that are interested in receiving MBSFN services and/or particular MBSFN services, and sends the UE measurement reports and UE count information to the MCE. Based on the received information, the MCE then determines whether particular eNBs should be part of the multicast broadcast service area and/or part of particular MBSFN areas. In step 1012, the MCE sends an MCE configuration update to the eNB1 and receives an MCE configuration update response from the eNB1. In step 1014, the MCE sends MBMS scheduling information to the eNB1. The MBMS scheduling information may include an MBSFN area identifier (ID), PMCH configuration information, and a reserved cell indication. The MCE may send information, explicitly or implicitly, to the eNB1 indicating an adapted MBSFN configuration in relation to the multicast broadcast service area and/or MBSFN areas within the MCE configuration update in step 1012 or the MBMS scheduling information in step 1014. In one configuration, the adaptive MBSFN configuration information may be sent, explicitly or implicitly, within the M2 setup request in step 1006, assuming the measurement report and counting procedures of step 1010 is performed before step 1006. In another configuration, the adaptive MBSFN configuration information may be sent, explicitly or implicitly, within an eNB configuration update acknowledgment. In step 1016, the eNB1 sends an MBMS scheduling information response to the MCE. In step 1018, the MCE sends a session start request to the eNB1. In step 1020, the MCE receives a session start response from the eNB1. In step 1022, the MCE repeats steps 1006 through 1016 with the eNB2. In step 1024, the MCE may receive UE count information from the MME in a backend counting procedure in which UE count information is received from the MME. The MCE may use the UE count information from the eNBs and/or the MME when determining the adaptive MBSFN configuration for each of the adaptive eNBs.

Figure 11:
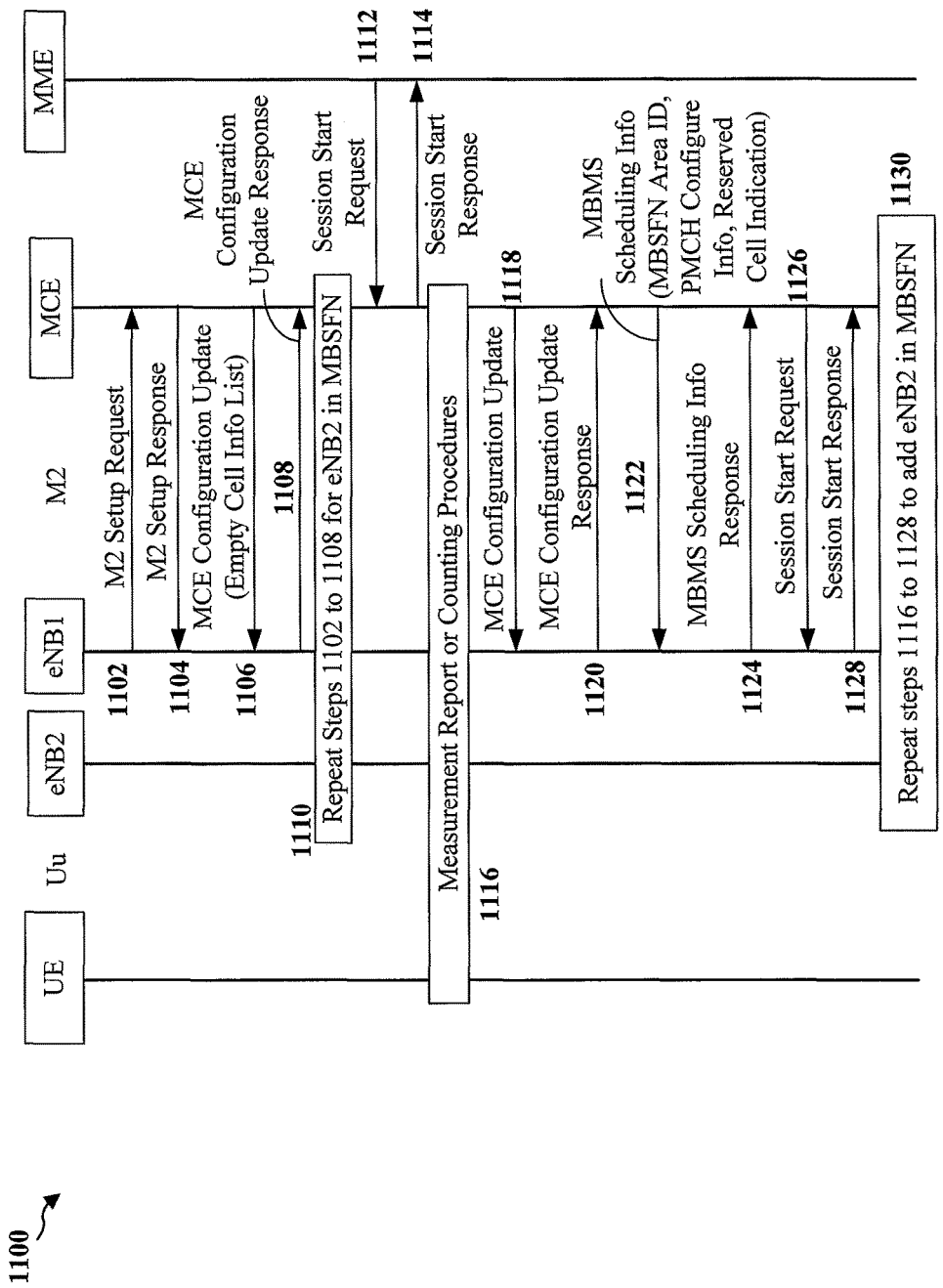
FIG. 11 is a diagram illustrating a second exemplary signaling design for an adaptive MBSFN.

FIG. 11 is a diagram 1100 illustrating a second exemplary signaling design for an adaptive MBSFN. As shown in FIG. 11, in step 1102, the eNB1 sends an M2 interface setup request to the MCE. In step 1104, the MCE responds by sending an M2 interface setup response to the eNB1. In step 1106, the MCE may send an MCE configuration update to the eNB1. The MCE may send the MCE configuration update to the eNB1 with an empty Cell Information List Information Element (IE) if the MCE does not want the eNB1 to send MCCH/MTCH. In step 1108, the eNB1 sends an MCE configuration update response to the MCE. In step 1110, the MCE may repeat steps 1102 to 1108 for the eNB2. In step 1112, the MME sends a session start request to the MCE. In step 1114, the MCE responds by sending a session start response to the MME. In step 1116, the eNB1 and eNB2 obtain UE measurement reports and UE count information indicating a number of UEs served by the eNB1 and eNB2, respectively, that are interested in receiving MBSFN services and/or particular MBSFN services, and send the UE measurement reports and UE count information to the MCE. Based on the received information, the MCE then determines whether particular eNBs should be part of the multicast broadcast service area and/or part of particular MBSFN areas. In step 1018, the MCE sends an MCE configuration update to the eNB1. The MCE configuration update may change the multicast broadcast service area and/or particular MBSFN areas of the eNB1. In step 1120, the MCE receives an MCE configuration update response from the eNB1. In step 1122, the MCE sends MBMS scheduling information to the eNB1. The MBMS scheduling information may include an MBSFN area ID, PMCH configuration information, and a reserved cell indication. The MCE may signal to the eNB1 that the eNB1 should not broadcast MCCH/MTCH through the reserved cell indication by informing the eNB1 that it is a reserved cell. In step 1124, the eNB1 sends an MBMS scheduling information response to the MCE. In step 1126, the MCE sends a session start request to the eNB1. In step 1128, the eNB1 sends a session start response to the MCE. In step 1130, the MCE may repeat the steps 1116 to 1128 with the eNB2.

Figure 12:
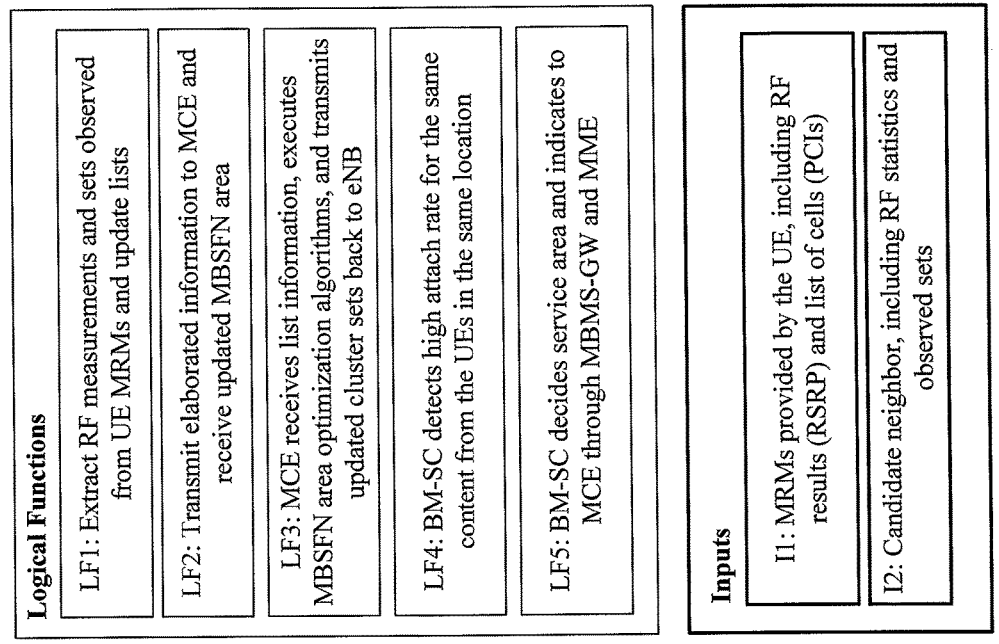
FIG. 12 is a diagram illustrating a second exemplary architecture for adaptively configuring multicast broadcast service areas/MBSFN areas.
Figure 12:
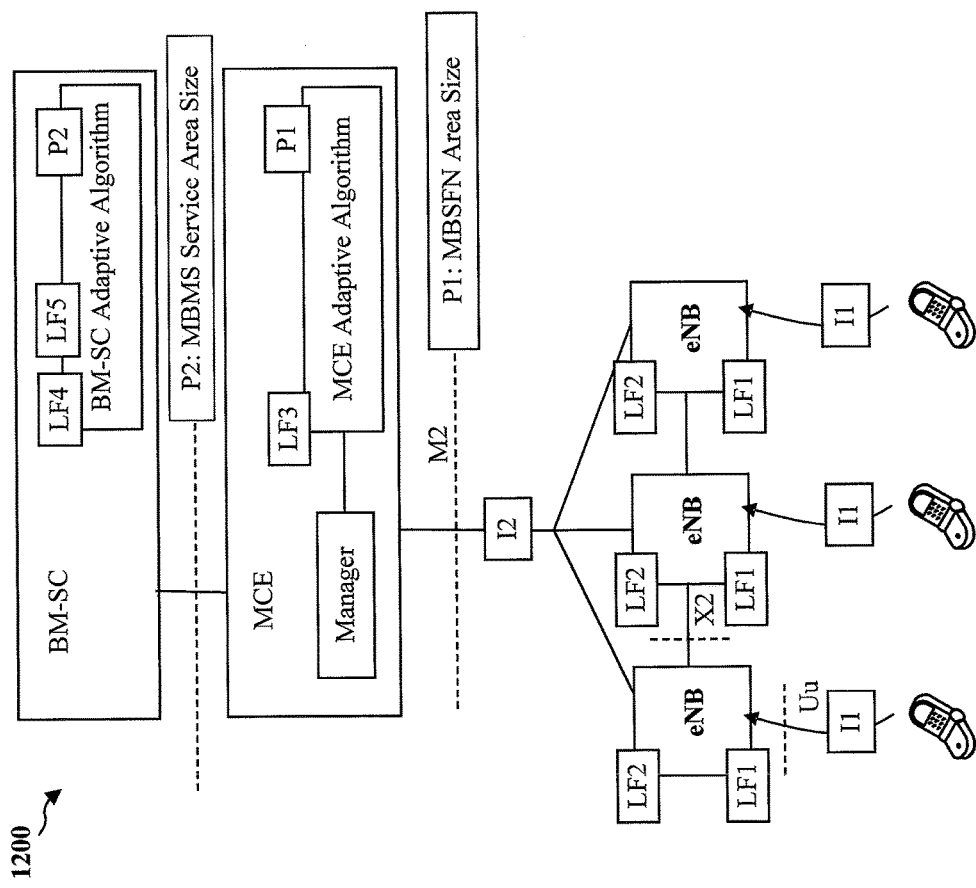

FIG. 12 is a diagram 1200 illustrating a second exemplary architecture for adaptively configuring multicast broadcast service areas/MBSFN areas. UEs are instructed by serving eNBs to measure and to send UE measurement reports about the serving eNB and surrounding/neighboring eNBs. The UEs may also report on whether they would like to receive MBSFN services or particular MBSFN services. The UEs send the information within the input I1 to the eNBs. The input I1 includes MRMs, and may further include information for obtaining a count of UEs (i.e., UE count information) interested in MBSFN services or particular MBSFN services. The MRMs include RF results, such as RSRP, RSRQ, RSSI, or SNR measurements. The MRMs may further include a list of cells (e.g., PCIs). The eNBs receive the input I1 from the UEs.

In logical function LF1, the eNBs extract RF measurements and obtain the list of cells. The eNBs may also determine a count of UEs (i.e., UE count information) that would like to receive MBSFN services or particular MBSFN services. The eNBs may also rank the list of cells. In the logical function LF2, the eNBs transmit elaborated information to the MCE and receive an updated multicast broadcast service area and/or MBSFN area. The elaborated information may include the RF measurements and list of cells. The elaborated information may further include the UE count information. Alternatively or additionally, the elaborated information may include the ranked list of cells if the eNBs rank the cells. The eNBs send input I2 to the MCE. The input I2 includes candidate neighbors, including RF statistics and observed sets. In logical function LF3, the MCE receives the list information, executes MBSFN area optimization algorithms to maximize a goal function for adjusting to the network load and MBMS user distribution, and transmits updated cluster sets (i.e., multicast broadcast service area and/or MBSFN area configurations) back to the eNBs indicating whether the eNBs should be part of the multicast broadcast service area and/or part of particular MBSFN areas. In logical function LF4, the BM-SC detects a high attach rate for (e.g., receiving, desire to receive) the same content from the UEs in the same location. In logical function LF5, the BM-SC determines the multicast broadcast service area and/or particular MBSFN areas for some eNBs and indicates the MBSFN configuration to the MCE through the MBMS Gateway (MBMS-GW) and MME.

Figure 13:
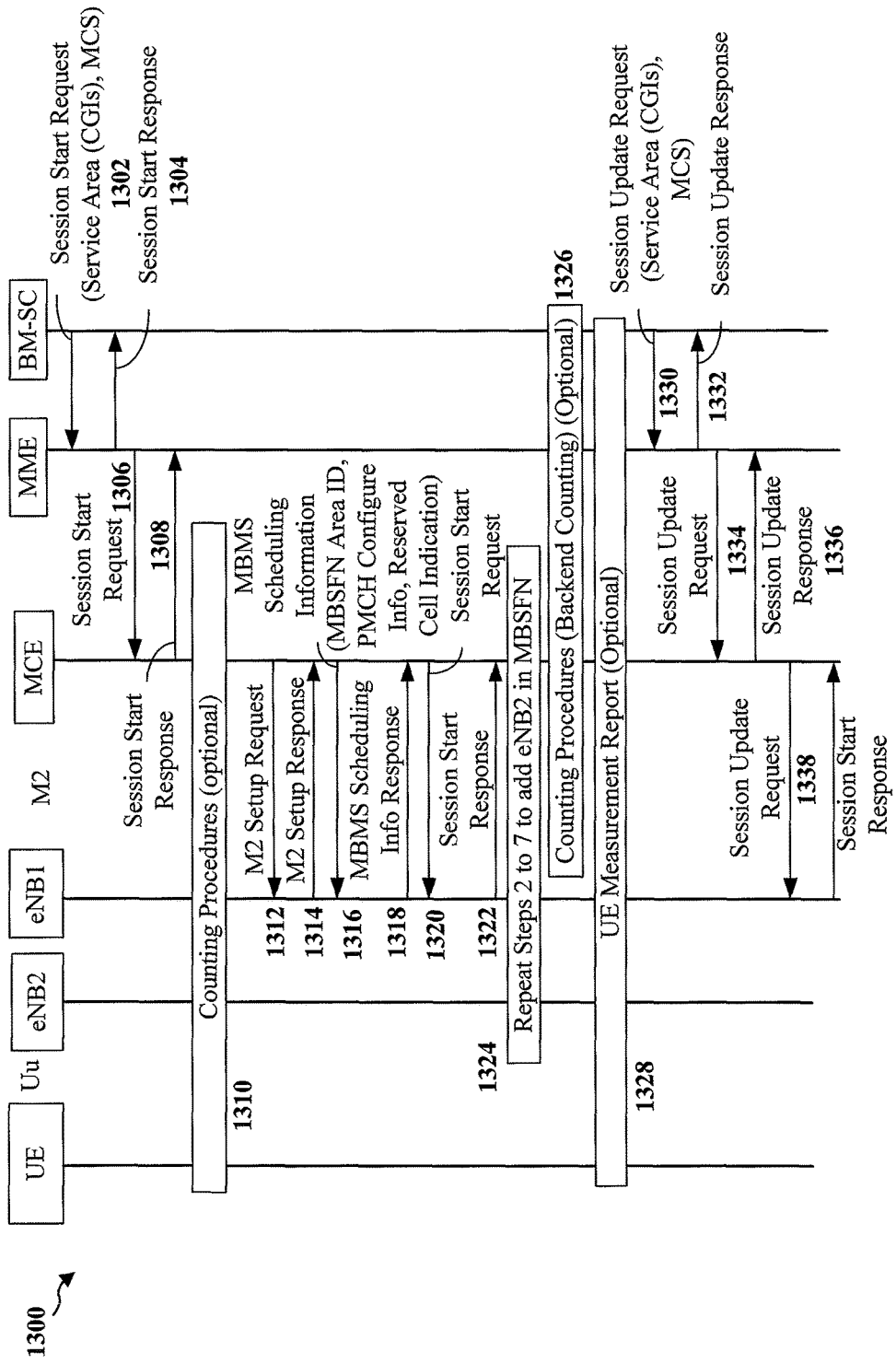
FIG. 13 is a diagram illustrating a third exemplary signaling design for an adaptive MBSFN.

FIG. 13 is a diagram 1300 illustrating a third exemplary signaling design for an adaptive MBSFN. As shown in FIG. 13, in step 1302, the BM-SC sends a session start request to the MME. The session start request may include a list of Cell Global Identities (CGIs) defining an adaptive MBSFN configuration and an MBSFN configuration, such as MCCH/MTCH configurations (e.g., a modulation and coding scheme (MCS)). In step 1304, the MME sends a session start response to the BM-SC. In step 1306, the MME sends a session start request to the MCE. In step 1308, the MCE responds by sending a session start response to the MME. In step 1310, the MCE may obtain the UE count information for the BM-SC. In step 1312, the MCE sends an M2 interface setup request to the eNB1. In step 1314, the eNB1 responds by sending an M2 interface setup response to the MCE. In step 1316, the MCE sends MBMS scheduling information to the eNB1. The MBMS scheduling information may include an MBSFN area ID, PMCH configuration information, and a reserved cell indication. In step 1318, the eNB1 sends an MBMS scheduling information response to the MCE. In step 1320, the MCE sends a session start request to the eNB1. In step 1322, the MCE receives a session start response from the eNB1. In step 1324, the MCE repeats steps 1304 through 1314 with the eNB2. In step 1326, the BM-SC may obtain UE count information (see LF4 of FIG. 12). In step 1328, the BM-SC may also obtain UE measurement reports. Based on the UE count information and the UE measurement reports, the BM-SC may determine an adaptive MBSFN configuration for configuring particular eNBs to be part of the multicast broadcast service area and/or particular MBSFN areas. In step 1330, the BM-SC sends a session update request to the MME. The session update request includes a list of CGIs defining the determined adaptive MBSFN configuration and an MBSFN configuration. In step 1332, the MME sends a session update response to the BM-SC. In step 1334, the MME sends a session update request to the MCE. The session update request includes the adaptive MBSFN configuration. In step 1336, the MCE sends a session update response to the MME. In step 1338, the MCE sends a session update request to the eNB1. The session update request includes the adaptive MBSFN configuration. In step 1340, the eNB1 sends a session start response to the MCE.

Adaptive MBSFN, discussed supra in relation to FIGS. 8-13, may be applied to PTT/PTX. PTT/PTX may be provided through unicast transmissions or multicast/broadcast transmissions through eMBMS. Providing PTT/PTX through unicast channels may not be efficient for a large target group of UEs. Furthermore, eMBMS may be too slow for some types of communication. There is currently a need for MBMS bearer enhancements for PTT/PTX in order to reduce call latency. Furthermore, there is a need for service discovery and security enhancements when PTT/PTX is provided through eMBMS.

Figure 14:
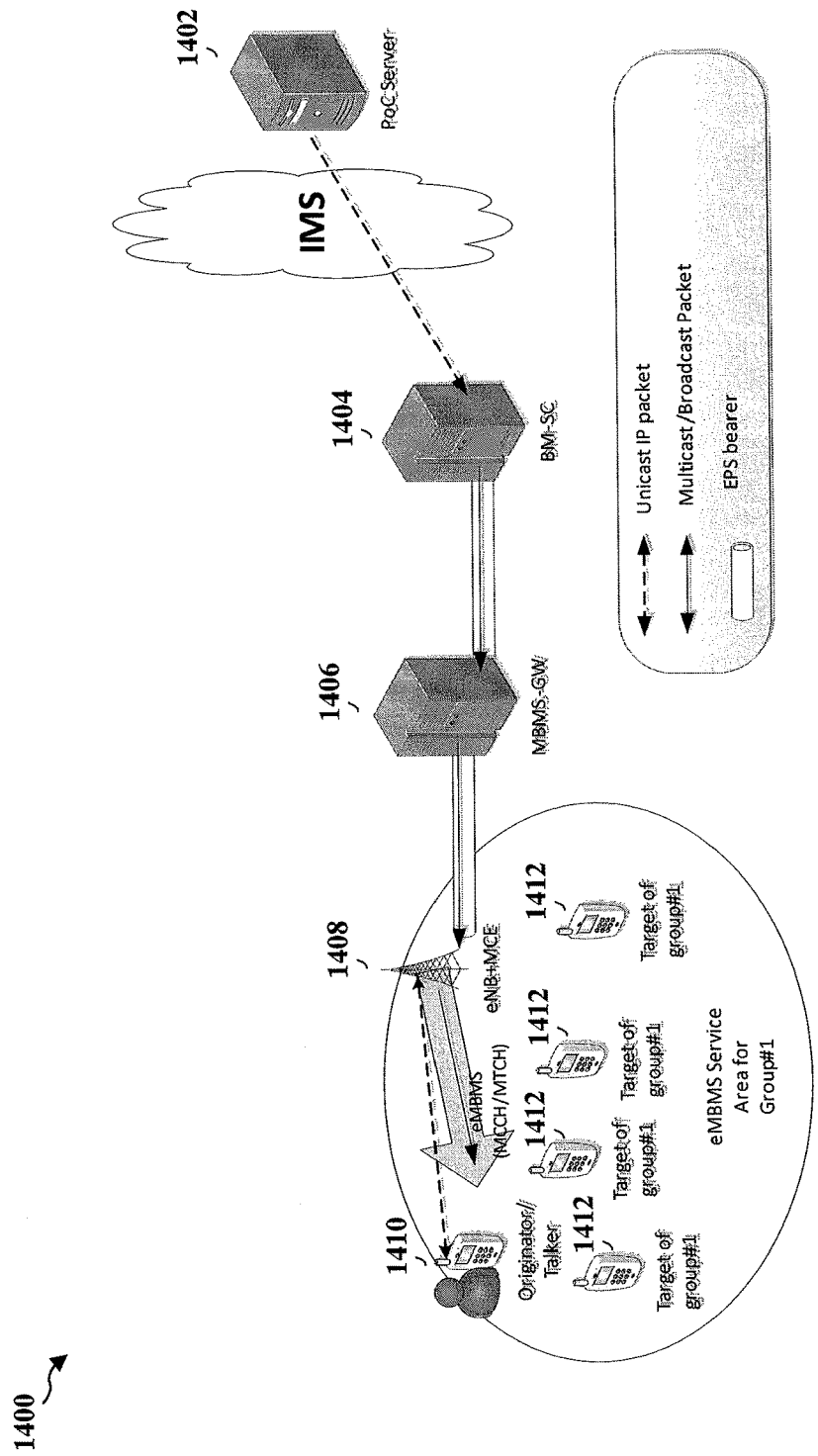
FIG. 14 is a diagram illustrating PTT/PTX through eMBMS.

FIG. 14 is a diagram 1400 illustrating PTT/PTX through eMBMS. As shown in FIG. 14, a PTT over cellular (PoC) server 1402 receives an IP packet from a UE 1410 (also referred to as a PoC originator) from a unicast channel through an eNB, P-GW/SGW. The PoC server 1402 sends a unicast IP packet to a BM-SC 1404 over an IP Multimedia Subsystem (IMS) (also referred to as IP Multimedia Core Network Subsystem). IMS is an architectural framework for delivering IP multimedia services. The BM-SC 1404 sends the IP packet (referred to now a multicast/broadcast IP packet) through SG-imb interface to an MBMS-GW 1406. The MBMS-GW 1406 forwards the multicast/broadcast IP packet through M1 interface to an eNB 1408. The signaling is between BM-SC and MBMS-GW through SGmb interface and between the MBMS-GW and MME through Sm interface and between MME and MCE through M3 interface and between MCE and eNB through M2 interface. The eNB 1408 broadcasts the multicast/broadcast IP packet to the UEs 1412 (also referred to as a PoC target) as an eMBMS service in an MTCH.

Figure 15:
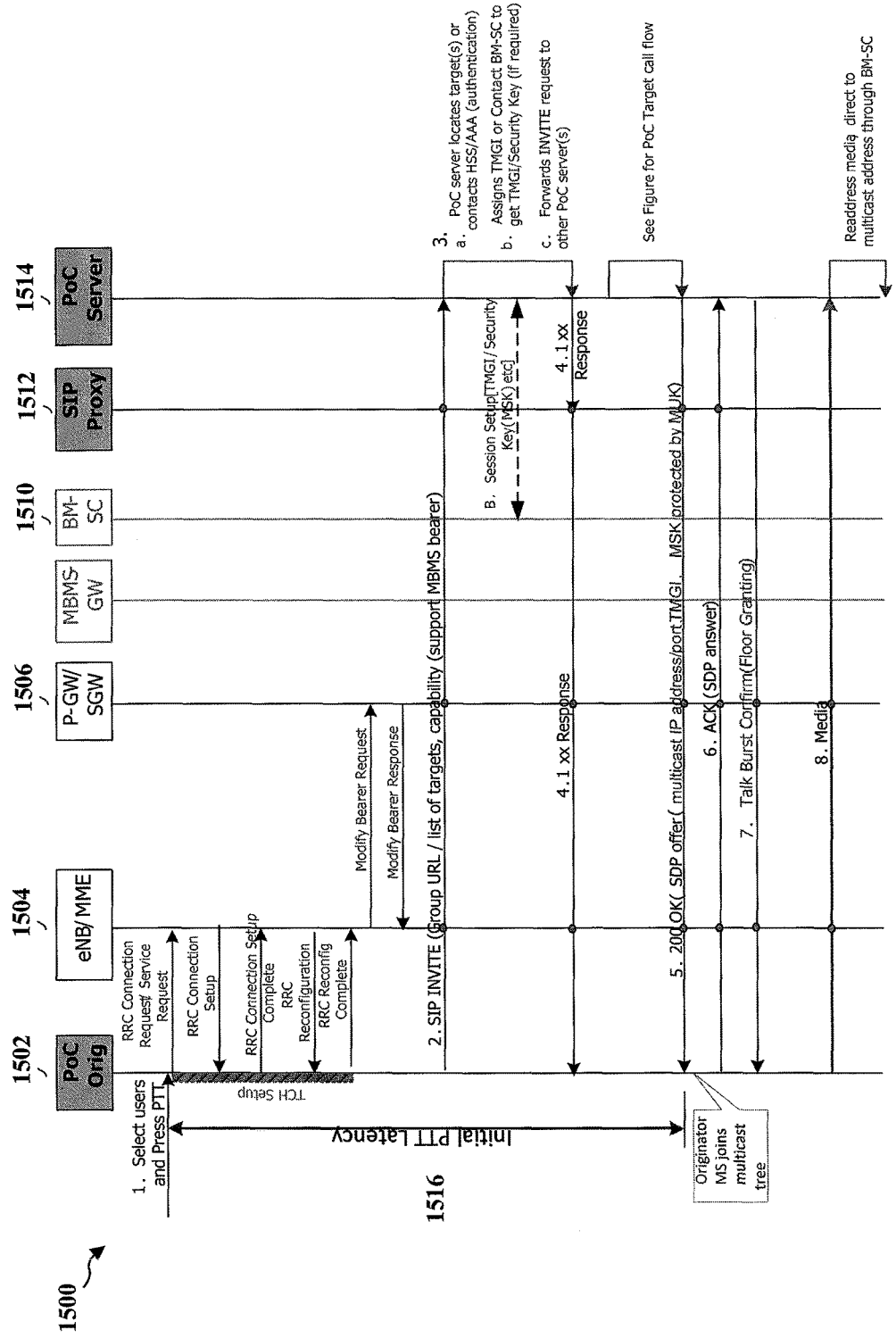
FIG. 15 is a diagram illustrating a first call flow using an MBMS bearer.

FIG. 15 is a diagram 1500 illustrating a first call flow using an MBMS bearer. In a first step, the UE 1502 performs a unicast traffic channel (TCH) setup with the eNB/MME 1504. In the unicast TCH setup, the UE 1502 sends the eNB/MME 1504 an RRC connection request/service request, the eNB/MME 1504 sends an RRC connection setup response to the UE 1502, the UE sends an RRC connection setup complete message to the eNB/MME 1504, and the UE 1502 sends an RRC reconfiguration complete message to the eNB/MME 1504 when the unicast TCH setup is complete. The eNB/MME 1504 subsequently sends a modify bearer request to the P-GW/SGW 1506. The P-GW/SGW 1506 responds with a modify bearer response. In a second step, the UE 1502 sends a session initiation protocol (SIP) invitation request to the eNB/MME 1504. The SIP invitation request is routed to a PoC server 1514 through the P-GW/SGW 1506 and a SIP proxy 1512. The SIP invitation request may include a group uniform resource locator (URL) and/or a group list of targets. The SIP invitation request may further include a UE capability. The UE capability may indicate whether the UE supports receiving communication through MBMS bearers. In a third step, the PoC server may 1514 locate target(s) or contact a home subscriber server (HSS) and/or an authentication, authorization, and accounting (AAA) server for authentication. In addition, the PoC server 1514 may assign a TMGI for the PTT/PTX communication originating from the UE 1502. The PoC server 1514 may contact the BM-SC 1510 to obtain the TMGI and/or security key (e.g., an MBMS session key (MSK)) for the communication. The PoC server 1514 may forward the SIP invitation request to other PoC servers. In a fourth step, the PoC server 1514 sends a SIP invitation response (also referred to as a1xx response) to the UE 1502. The SIP invitation response may be routed through the SIP proxy 1512, the P-GW/SGW 1506, and the eNB/MME 1504. After the fourth step, a PoC server that received the SIP invitation request from the PoC server 1514 may set up the PoC targets. In a fifth step, the PoC server 1514 sends a session description protocol (SDP) offer (also referred to as a 200 OK response) to the UE 1502. The PoC server 1514 received the SDP offer from a target UE or from another PoC server associated with the target UE. The SDP offer may be routed through the SIP proxy 1512 and the P-GW/SGW 1506. The SDP offer may include one or more of a multicast IP address/port, a TMGI, and an MSK protected by an MBMS user key (MUK). The MSK may be used to generate an MBMS traffic key (MTK). The time that is taken between the start of the first step and the completion of the fifth step is an initial PTT latency 1516. In a sixth step, the UE 1502 acknowledges the SDP offer by sending an SDP answer to the eNB 1504, which may be routed to the PoC server 1514 through the P-GW/SGW 1506 and the SIP proxy 1512. In a seventh step, the PoC server 1514 may inform the UE 1502 via a talk burst confirm message that the UE 1502 may now send data/media via the PTT/PTX provided through eMBMS. In an eighth step, the UE 1502 sends the data/media to the eNB 1504, which may be routed to the PoC server 1514 through the P-GW/SGW 1506.

Figure 16:
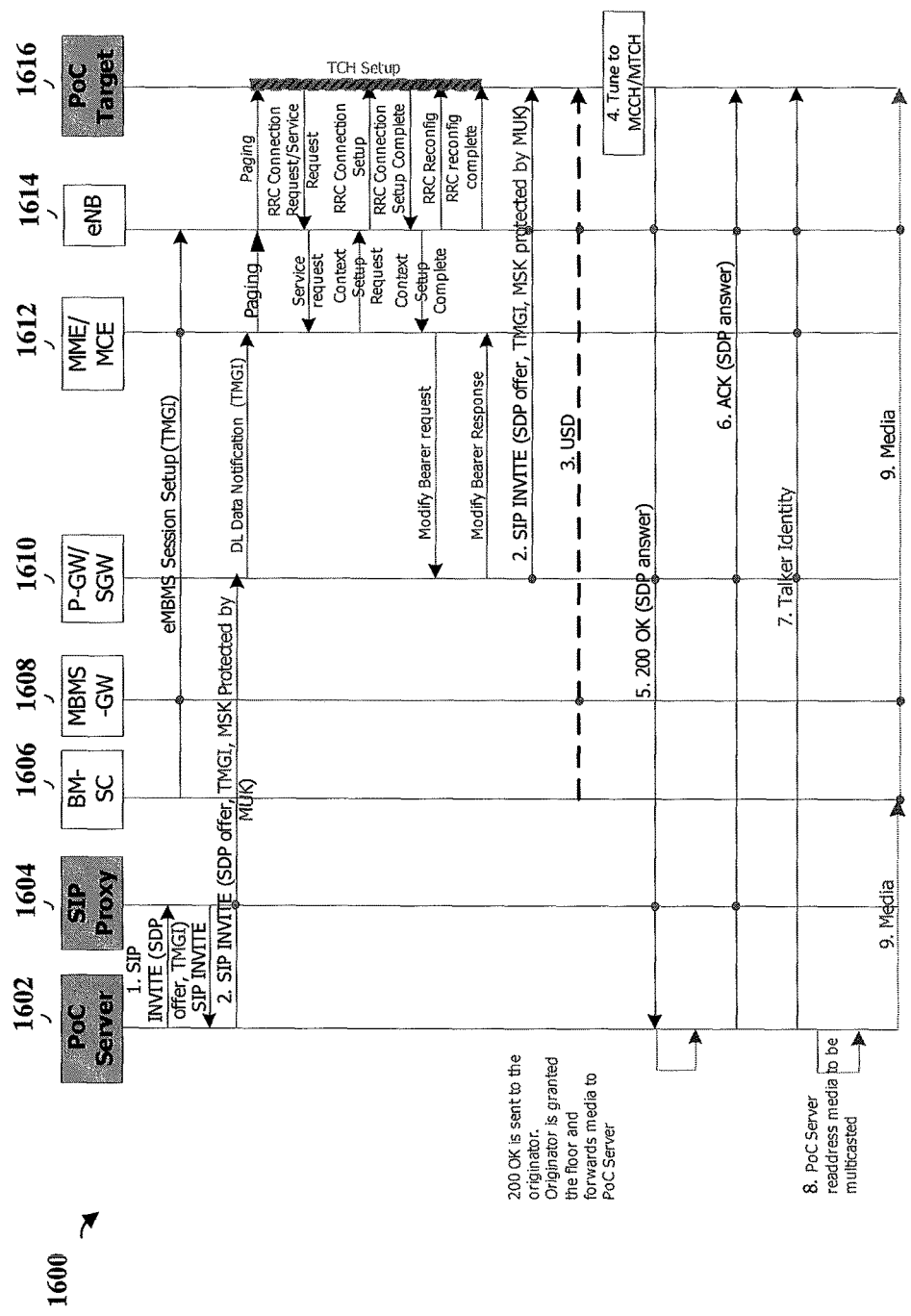
FIG. 16 is a diagram illustrating a second call flow using an MBMS bearer.

FIG. 16 is a diagram 1600 illustrating a second call flow using an MBMS bearer. A PoC server 1602 receives the SIP invitation request from the PoC server 1514. The SIP invitation request includes the SDP offer. As discussed supra, the SDP offer may include one or more of a multicast IP address/port, the assigned TMGI, and an MSK. In a first step, the PoC server 1602 sends the SIP invitation request to a SIP proxy 1604. In addition, a BM-SC 1606 performs an eMBMS session setup and provides the assigned TMGI for the PTT/PTX data/media to an MBMS-GW 1608, which provides the assigned TMGI to an MME/MCE 1612, which provides the assigned TMGI to an eNB 1614. The SIP proxy 1604 responds to the PoC server 1602 with a SIP invitation response. In a second step, the PoC server 1602 sends the SIP invitation request to a P-GW/SGW 1610. The SIP invitation request is routed through the SIP proxy 1604. The SIP invitation request may include the SDP offer. The P-GW/SGW 1610 sends a DL data notification including the assigned TMGI to the MME/MCE 1612. The eNB 1614 sends a paging message (which may be a group paging message) to the target UEs, including the target UE (PoC target) 1616. Based on the received paging message, the UE 1616 performs a unicast TCH setup with the eNB 1614. The MME/MCE 1612 sends a modify bearer request to the P-GW/SGW 1610. The P-GW/SGW 1610 responds to the MME/MCE 1612 with a modify bearer response. The P-GW/SGW 1610 forwards a SIP invitation request to the UE 1616. The SIP invitation request includes the SDP offer, which includes the TMGI and the MSK. In a third step, the UE 1616 may receive a user service description (USD). In a fourth step, the UE 1616 receives the MCCH and tunes to the MTCH corresponding to the received TMGI. In a fifth step, the UE 1616 sends an SDP answer (also referred to as a 200 OK response) to the PoC server 1602. The SDP answer is routed to the PoC server 1602 through the eNB 1614, the P-GW/SGW 1610, and the SIP proxy 1604. The PoC server 1602 sends the SDP answer to the PoC server 1514, which forwards the SDP answer to the UE 1502. In a sixth step, the PoC server 1602 acknowledges by sending an SDP answer to the UE 1616. The SDP answer is routed through the SIP proxy 1604, the P-GW/SGW 1610, and the eNB 1614. In a seventh step, the PoC server 1602 sends a talker identity to the UE 1616. The talker identity is an identity of the user of the UE 1502. The talker identity is routed through the P-GW/SGW 1610, the MME/MCE 1612, and the eNB 1614. The eNB 1614 may send the talker identity through the eMBMS resources. In an eighth step, the PoC server 1602 readdresses received PTT/PTX data/media to be multi-casted. In a ninth step, the PoC server 1602 sends the received PTT/PTX data/media to the UE 1616. The PTT/PTX data/media is routed through the BM-SC 1606, the MBMS-GW 1608, and the eNB 1614, which sends the PTT/PTX data media through eMBMS on the MTCH corresponding to the assigned TMGI.

Service Discovery Enhancement

In one configuration, a group or an MBMS user service may be preconfigured. For each prearranged group, the eMBMS system may pre-assign a unique multicast IP address/port and a TMGI. One or more TMGIs can be pre-allocated. For PTX, one TMGI may be used for all file downloading. A file delivery table (FDT) instance of a scheduling fragment may be used by a UE for determining the files to be downloaded by the UE. UEs may be aware of the MBMS user service identifier (ID) or the TMGI(s) associated with the group addresses, along with other group information for the groups of which the UEs are a member. The MBMS user service ID may be used to hide transport details from a UE. eMBMS middleware may manage transport details with a service announcement file. When MBMS is preconfigured, the MBMS is effectively always on, and the BM-SC 1606 does not perform the eMBMS session setup step.

If TMGIs are not pre-allocated for PTT/PTX (e.g., the group or the MBMS user service is not pre-configured) (see FIGS. 15, 16), such as in an adhoc group call, group call setup signaling may be used (e.g., the SIP signaling provided with respect to FIGS. 15, 16). As discussed in relation to FIGS. 15, 16, the group call setup signaling may include MBMS session information, such as the MBMS user service name, TMGI, SDP, USD, etc. A group call server may use the MBMS bearer for a large group and interfaces with a BM-SC to initiate the MBMS session. A UE may acquire service information through the group call setup signaling. Group paging may be used. A TMGI or an MBMS user service ID may be included in a paging message. Referring to FIG. 16, the paging message from the eNB 1614 to the UE 1616 may be a group paging message that includes a TMGI and/or an MBMS user service ID.

Minimize Call Latency

Call latency may be on the order of seconds for PTT/PTX through an MBMS bearer. Call latency should preferably be less than 300 ms. In one configuration, the MBMS bearer may be pre-setup or the MBMS session may be preconfigured to be immediately available. When the MBMS session is not being used for a group call, the resources may be allocated to unicast traffic. In one configuration, call latency may be reduced by reducing an LTE radio interface call setup time. In one configuration, the target radio interface call setup may be performed in parallel with the originator call setup interface (see FIGS. 17, 18). In this configuration, PTT call setup signaling (e.g., SIP invitation request) may be piggybacked in a RACH, RRC connection setup request, or RRC connection setup complete. In one configuration, a group ID, a TMGI, or an MBMS service ID may be included in a paging message. In one configuration, group call setup signaling (e.g., SIP signaling) may include MBMS session information, such as an MBMS user service name, TMGI, SDP, USD, etc. In one configuration, call latency may be reduced by not setting up the unicast channel on call setup SIP signaling for target UEs (see FIG. 18). SIP signaling may be sent over MBMS to all target UEs. SIP signaling may be sent to a preconfigured MBMS bearer. An MBMS group key (MGK) may be needed to protect MSK sent to the UEs. A UE may get the MGK when the UE is registered in a group with the network. A fake 200 OK message may be sent to the originator UE from a PoC/group call server if the group size is sufficiently large. Call latency may be reduced by using one or more of the aforementioned configurations.

Figure 17:
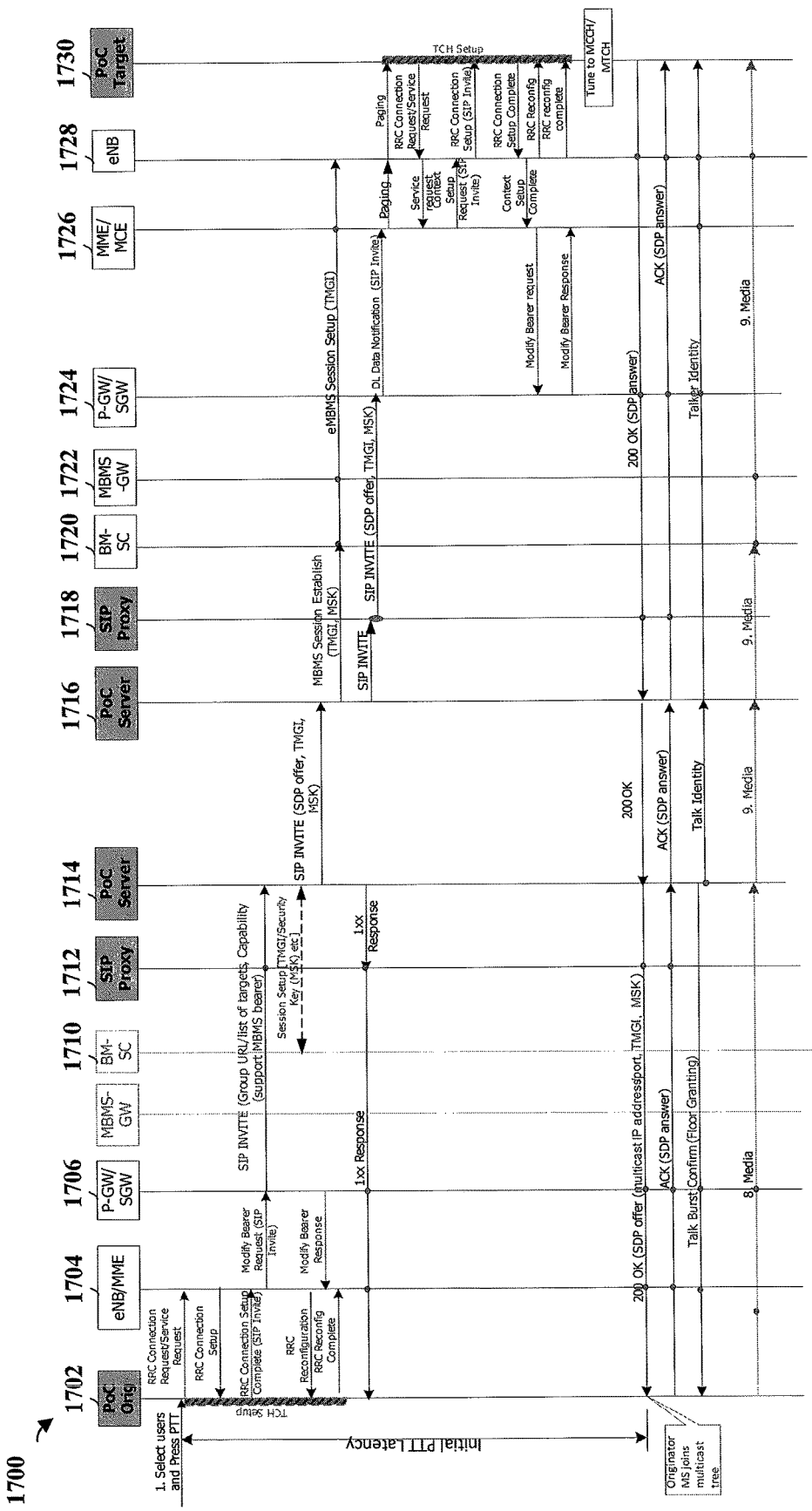
FIG. 17 is a diagram illustrating a first parallel call setup.

FIG. 17 is a diagram 1700 illustrating a first parallel call setup. In FIG. 17, call latency may be reduced by performing a parallel call setup. As shown in FIG. 17, in order to reduce call latency, the UE 1702 may include the SIP invitation request to the eNB/MME 1704 within an RRC connection setup message during unicast TCH setup. The eNB/MME 1704 may forward the SIP invitation request through a modify bearer request to the P-GW/SGW 1706, which may forward the SIP invitation request to the PoC server 1714 through the SIP proxy 1712. The PoC server 1714 may assign a TMGI or obtain a TMGI from the BM-SC 1710. The PoC server 1714 may send the SIP invitation request to the PoC server 1716 while the UE 1702 is performing unicast TCH setup. The SIP invitation request may include an SDP offer, the assigned TMGI, and an MSK. The SDP offer may itself include the assigned TMGI and the MSK. The PoC server 1716 establishes an MBMS session with the BM-SC 1720 and provides the assigned TMGI and the MSK to the BM-SC 1720. The BM-SC 1720 performs an eMBMS session setup and provides the assigned TMGI for the PTT/PTX data/media to an MBMS-GW 1722, which provides the assigned TMGI to an MME/MCE 1726, which provides the assigned TMGI to an eNB 1728. The PoC server 1716 sends the SIP invitation request to the SIP proxy 1718. The SIP proxy 1718 sends the SIP invitation request to a P-GW/SGW 1724. The SIP invitation request may include the SDP offer, the assigned TMGI, and the MSK. The P-GW/SGW 1724 sends a DL data notification including the assigned TMGI to the MME/MCE 1726. The eNB 1728 sends a paging message (which may be a group paging message) to the target UEs, including the target UE 1730. Based on the received paging message, the UE 1730 performs a unicast TCH setup with the eNB 1728. The UE 1730 receives a SIP invitation request in an RRC connection setup message during the unicast TCH setup. The SIP invitation request includes the assigned TMGI. The MME/MCE 1726 sends a modify bearer request to the P-GW/SGW 1724. The P-GW/SGW 1724 responds to the MME/MCE 1726 with a modify bearer response. The UE 1730 receives the MCCH and tunes to the MTCH corresponding to the received TMGI. Thereafter, the UE 1730 sends an SDP answer to the UE 1702. The UE 1702 acknowledges by sending an SDP answer to the UE 1730. The PoC server 1714 sends a talk burst confirm message granting the UE 1702 permission to send PTT/PTX data/media to the target UE 1730. The PoC server 1714 sends a talker identity to the UE 1730. Thereafter, the UE 1702 sends the PTT/PTX data/media to the UE 1730. The UE 1702 sends the PTT/PTX data/media to the network through a unicast bearer. The network sends the PTT/PTX data/media to the UE 1730 through an MBMS bearer.

Figure 18:
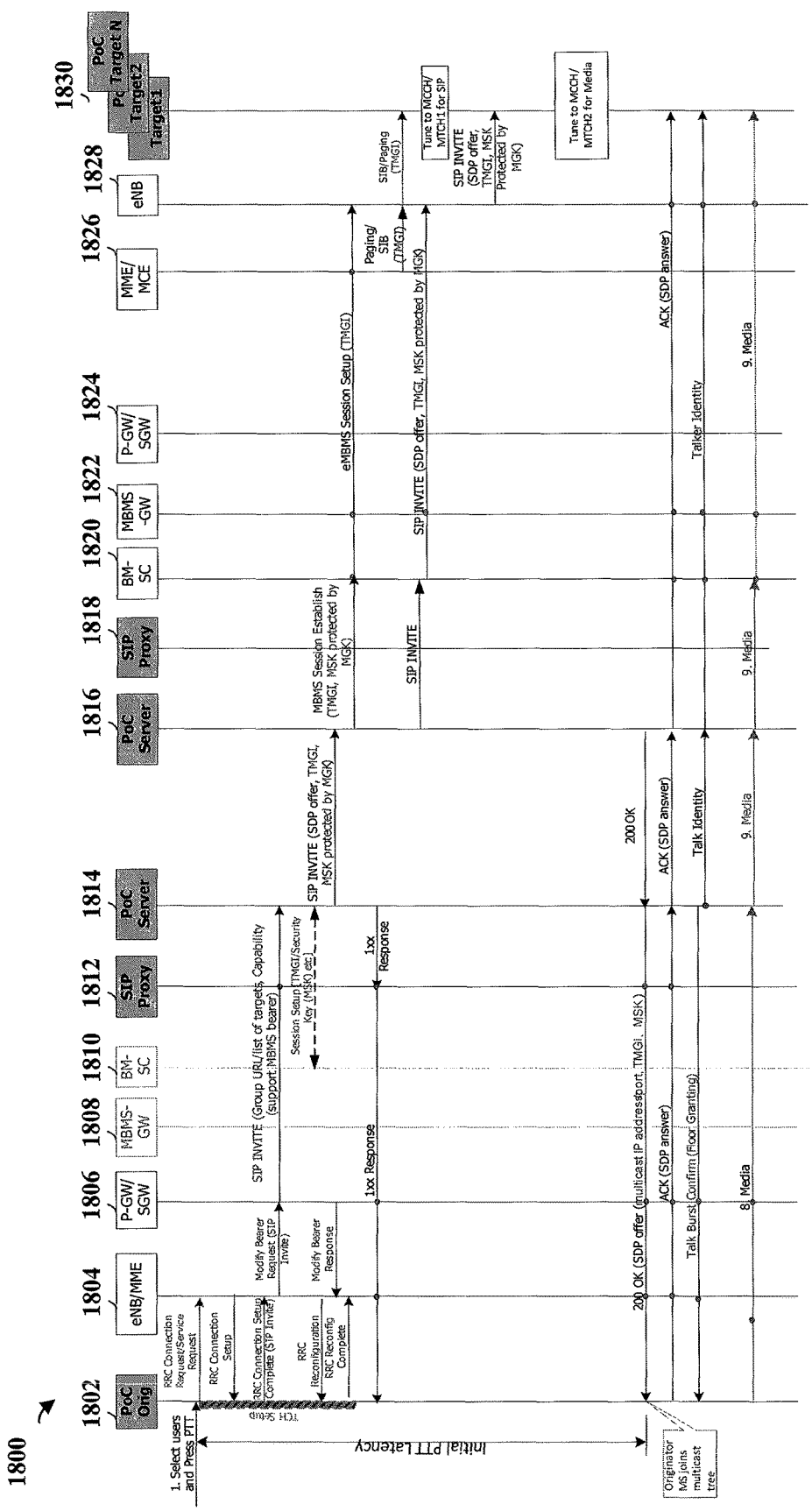
FIG. 18 is a diagram illustrating a second parallel call setup.

FIG. 18 is a diagram 1800 illustrating a second parallel call setup. In FIG. 18, call latency may be reduced by performing a parallel call setup and removing the requirement that the target UEs perform a unicast TCH setup. As shown in FIG. 18, in order to reduce call latency, the UE 1802 may include the SIP invitation request to the eNB/MME 1804 within an RRC connection setup message during unicast TCH setup. The eNB/MME 1804 may forward the SIP invitation request through a modify bearer request to the P-GW/SGW 1806, which forwards the SIP invitation request to the PoC server 1814 through the MBMS-GW 1808, the BM-SC 1810, and the SIP proxy 1812. The PoC server 1814 may assign a TMGI or obtain a TMGI from the BM-SC 1810. The PoC server 1814 may send the SIP invitation request to the PoC server 1816 while the UE 1802 is still performing unicast TCH setup. The SIP invitation request may include an SDP offer, the assigned TMGI, and an MSK. The MSK may be protected by an MBMS group key (MGK). The SDP offer may itself include the assigned TMGI and the MSK. The PoC server 1816 establishes an MBMS session with the BM-SC 1820 and provides the assigned TMGI or a different TMGI and the MSK to the BM-SC 1820. The BM-SC 1820 performs an eMBMS session setup and provides the received TMGI for receiving a SIP invitation request to an MBMS-GW 1822, which provides the TMGI to an MME/MCE 1826, which provides the TMGI to an eNB 1828. The eNB 1828 pages the target UEs 1830 and includes information indicating the TMGI within the paging message or includes information within the paging message that allows the target UEs 1830 to obtain the TMGI. The PoC server 1816 sends the SIP invitation request through the SIP proxy 1818 to the BM-SC 1820. The SIP invitation request includes the assigned TMGI. The BM-SC 1820 sends the SIP invitation request to the eNB 1828. The SIP invitation request may include the SDP offer, the assigned TMGI, and the MSK. The UEs 1830 receive the MCCH and tune to the MTCH corresponding to the received TMGI in order to receive a SIP invitation request. Thereafter, the eNB 1828 sends the SIP invitation request to the UEs 1830. The SIP invitation request may include the SDP offer, the assigned TMGI, and the MSK. The UEs 1830 receive the MCCH and tune to the MTCH corresponding to the assigned TMGI in order to receive the PTT/PTX data/media. The PoC server 1816 sends a fake 200 OK message to the PoC server 1814. The PoC server 1814 sends an SDP offer to the UE 1802. The UE 1802 acknowledges by sending an SDP answer to the UEs 1830. The PoC server 1814 sends a talk burst confirm message granting the UE 1802 permission to send PTT/PTX data/media to the target UEs 1830. The PoC server 1814 sends a talker identity to the UEs 1830. Thereafter, the UE 1802 sends the PTT/PTX data/media to the UEs 1830. The different MBMS bearers and TMGIs may be used for sending the call control signaling, talk burst control signaling, and PTT/PTX data/media. If same MBMS bearer and associated TMGI is used for sending the call control signaling, talk burst control signaling, and PTT/PTX data/media, FDT or other in-band signaling may be used to distinguish them.

Talk Burst Control Signaling

Talk burst control messages (e.g., the talk burst confirm messages of FIGS. 15-18) may be used to ensure that only one user is given a permission to speak while all other users listen. Talk burst control messages may be sent between a PoC server and originator and target UEs. A talk burst control message can be carried in user datagram protocol (UDP) based signaling with a specified special UDP port. A talk burst control message may be carried in real-time transport protocol (RTP) Control Protocol (RTCP) messages if RTP over MBMS is used. If dynamic adaptive streaming over hypertext transfer protocol (HTTP) (DASH) is used over MBMS, a talk burst control message may be carrier in extended SIP signaling, open mobile alliance (OMA) signaling, an HTTP extension, or FDT based signaling. The talk burst control message may be sent via MBMS or a shared channel if the message is sent to all listeners. The talker identity and a no talk indication may also be sent via MBMS or a shared channel. If queuing is supported, the PoC server may indicate permission to all listeners on the floor. Permission may be divided in time among different UEs in the queue.

Figure 19:
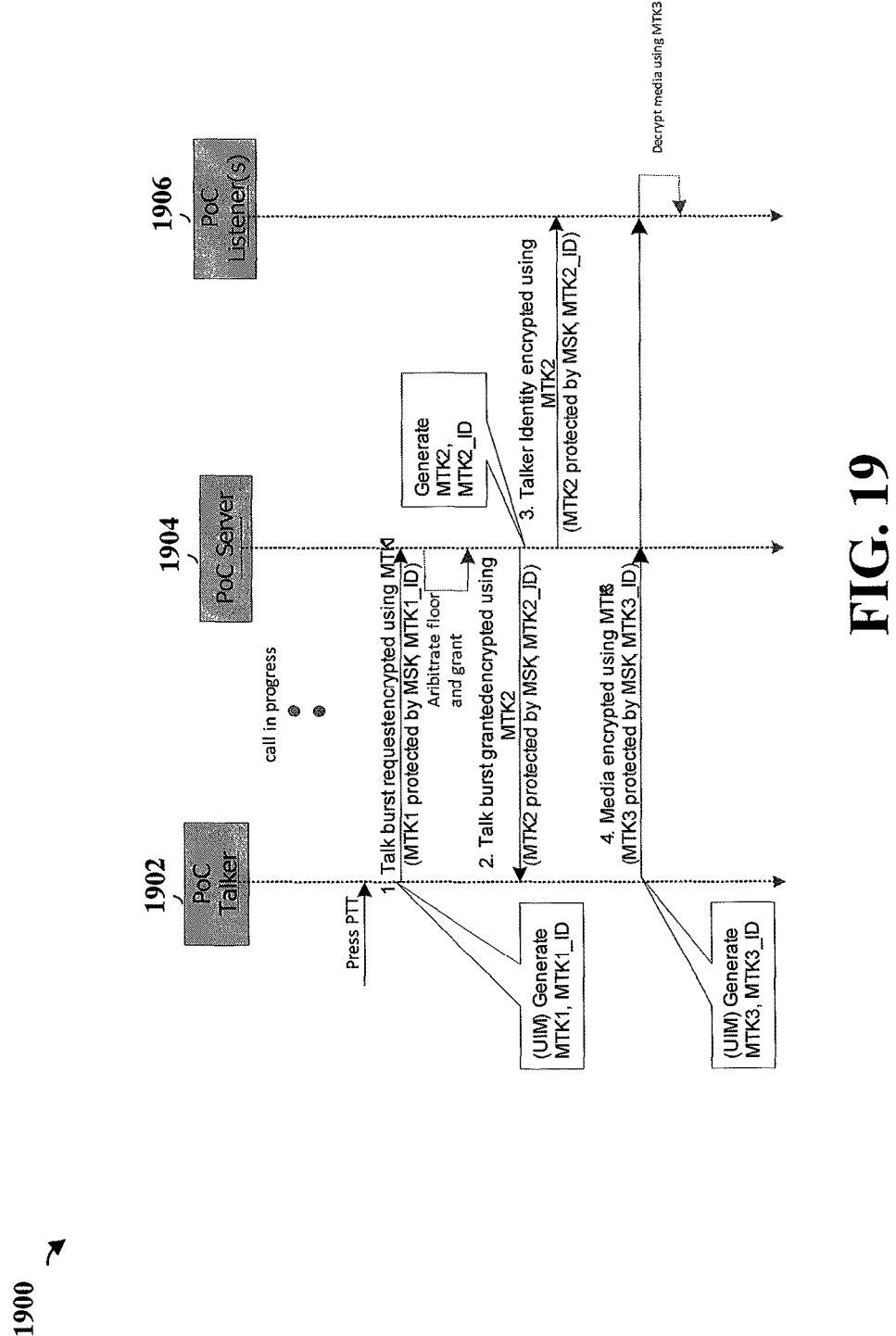
FIG. 19 is a diagram for illustrating security enhancements with an MBMS bearer for PTT/PTX.

FIG. 19 is a diagram 1900 for illustrating security enhancements with an MBMS bearer for PTT/PTX. In a first configuration, MTKs used for PTT/PTX data/media are generated by the UE (PoC Talker) 1902. The MTK used for talk burst control signaling is generated by the PoC server 1904. The PoC server 1904, upon receiving an MTK protected by an MSK and an MTK ID, sends the MTK protected by an MSK and MTK ID to a BM-SC. In a second configuration, the BM-SC generates MTKs and sends the MTKs, protected by an MSK, to the originator and target UEs through in-band signaling. Referring to FIG. 19, when a UE 1902 wants to initiate PTT/PTX communication, the UE 1902 generates a first MTK, referred to as an MTK1, and an ID for the MTK1, referred to as MTK1_ID. The MTK1 is protected based on an MSK and the MTK1_ID. The UE 1902 encrypts a talk burst request message based on the MTK1. In a first step, the UE 1902 sends the talk burst request to a PoC server 1904. The PoC server 1904 generates a second MTK, referred to as MTK2, and an ID for the MTK2, referred to as MTK2_ID. The MTK2 is protected based on the MSK and the MTK2_ID. The PoC server 1904 encrypts a talk burst granted message based on the MTK2. In a second step, the PoC server 1904 sends the talk burst granted message to the UE 1902. The PoC server 1904 encrypts a talker identity based on the MTK2. In a third step, the PoC server 1904 sends the talker identity to a target UE 1906. The UE 1902 generates a third MTK, referred to as an MTK3, and an ID for the MTK3, referred to as MTK3_ID. The MTK3 is protected based on the MSK and the MTK3_ID. The UE 1902 encrypts PTT/PTX data/media based on the MTK3. In a fourth step, the UE 1902 sends the PTT/PTX data/media protected by MTK3 to the UEs 1906 through the PoC server BM-SC.

Adaptive SFN, discussed in relation to FIGS. 8-13, may be utilized in relation to providing PTT/PTX through MBMS bearers. When an MBMS bearer is used, a group ID, a TMGI, or an MBMS user service ID may be used for paging. A UE and radio access network (RAN) capability may be reported to the PoC server. When a UE is moved in and out from an MBMS bearer area, the UE may notify the network or the network may handoff the UE to a proper channel.

Figure 20:
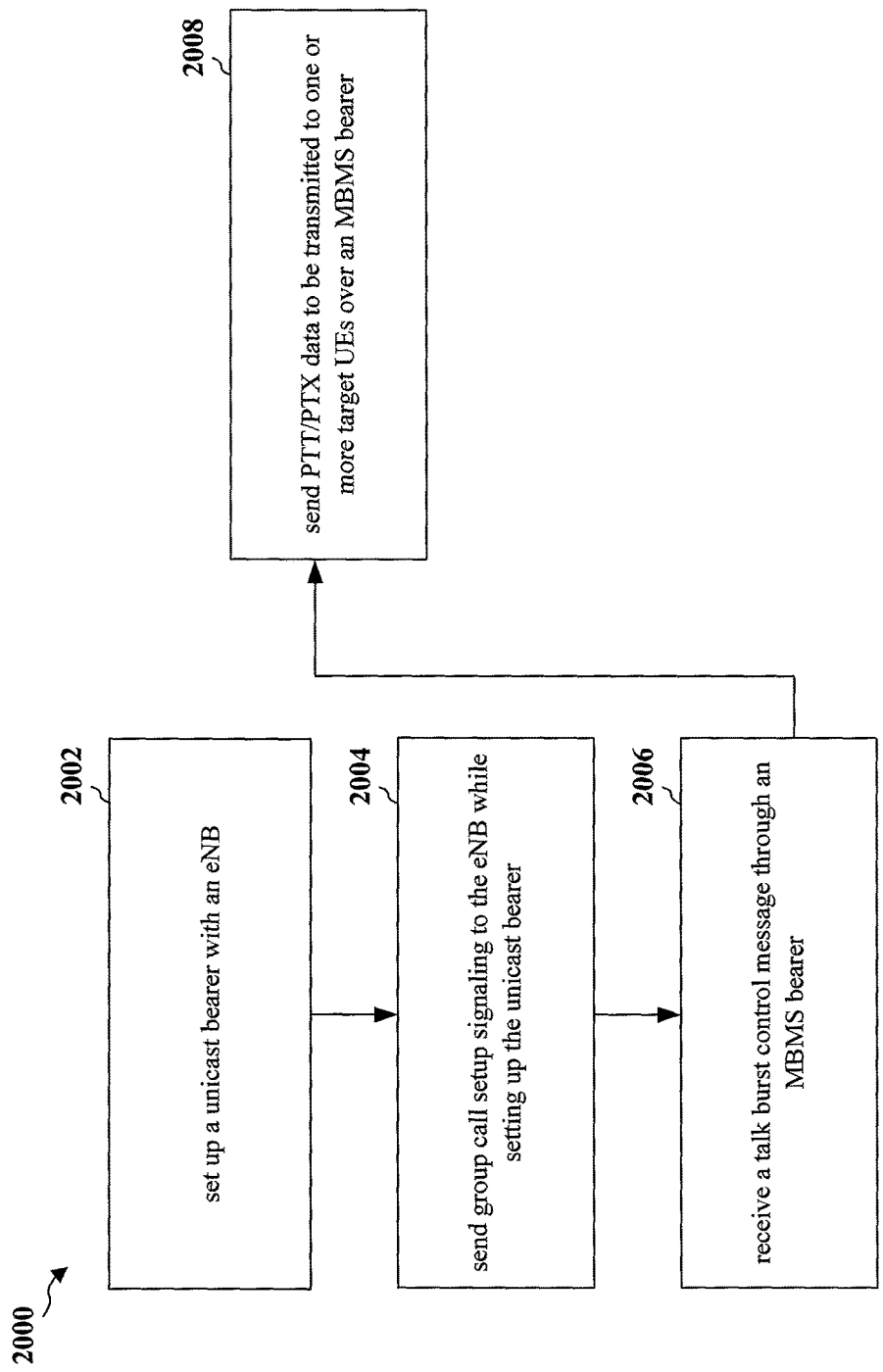
FIG. 20 is a flow chart of a first method of wireless communication.

FIG. 20 is a flow chart 2000 of a method of wireless communication. The method may be performed by a UE. The UE performs a PTT/PTX call setup for communication via MBMS. In step 2002, the UE performs the PTT/PTX call setup by setting up a unicast bearer with an eNB. In step 2004, the UE includes group call setup signaling to the eNB while setting up the unicast bearer. After setting up the unicast bearer, in step 2006, the UE may receive a talk burst control message from the eNB through an MBMS bearer. Subsequently, in step 2008, the UE may send PTT/PTX data to be transmitted to one or more target UEs over an MBMS bearer.

The group call setup signaling may include service announcement and discovery information for an MBMS bearer. The group call setup signaling may be a SIP invitation request. The SIP invitation request may include a list of target UEs. A UE may set up the unicast bearer by sending an RRC connection request, receiving an RRC connection setup response, and sending an RRC connection complete message. The group call setup signaling may be sent with the RRC connection complete message. For example, referring to FIG. 17, the RRC connection setup complete message sent during unicast TCH setup by the UE 1702 to the eNB 1704 includes a SIP invitation request.

In step 2006, a UE may receive a talk burst control message through an MBMS bearer. In step 2006, the talk burst control message may include at least one of an indication that PTT/PTX communication can be sent, an indication that PTT/PTX communication cannot be sent, or scheduling information for indicating when PTT/PTX communication can be sent. The talk burst control message may be received through one of a UDP, a SIP, an HTTP, an FDT instance, or OMA signaling. For example, referring to FIG. 17, the UE 1702 receives a talk burst confirm message granting the UE 1702 the floor, i.e., the permission to send the PTT/PTX data/media.

A UE may send a first talk burst control message encrypted based on a first set of MTKs. In addition, the UE may receive a second talk burst control message encrypted based on a second set of MTKs different than the first set of MTKs. Furthermore, the UE may send PTT/PTX data on an MBMS bearer based on a third set of MTKs different than the first set of MTKs and the second set of MTKs. For example, referring to FIG. 19, in a first step, the UE 1902 sends a first talk burst control message encrypted based on a first set of MTKs including MTK1. In addition, in a second step, the UE 1902 receives a second talk burst control message encrypted based on a second set of MTKs including MTK2. The second set of MTKs is different than the first set of MTKs. Furthermore, in a fourth step, the UE 1902 sends PTT/PTX data based on a third set of MTKs including MTK3. The third set of MTKs is different than the first set of MTKs and the second set of MTKs.

In step 2008, the UE sends PTT/PTX data to be transmitted to one or more target UEs over an MBMS bearer. For example, referring to FIG. 17, the UE 1702 sends PTT/PTX data to be transmitted to the target UE 1730 over an MBMS bearer. For another example, referring to FIG. 19, the UE 1902 sends PTT/PTX data to be transmitted to the target UE 1906 over an MBMS bearer.

Figure 21:
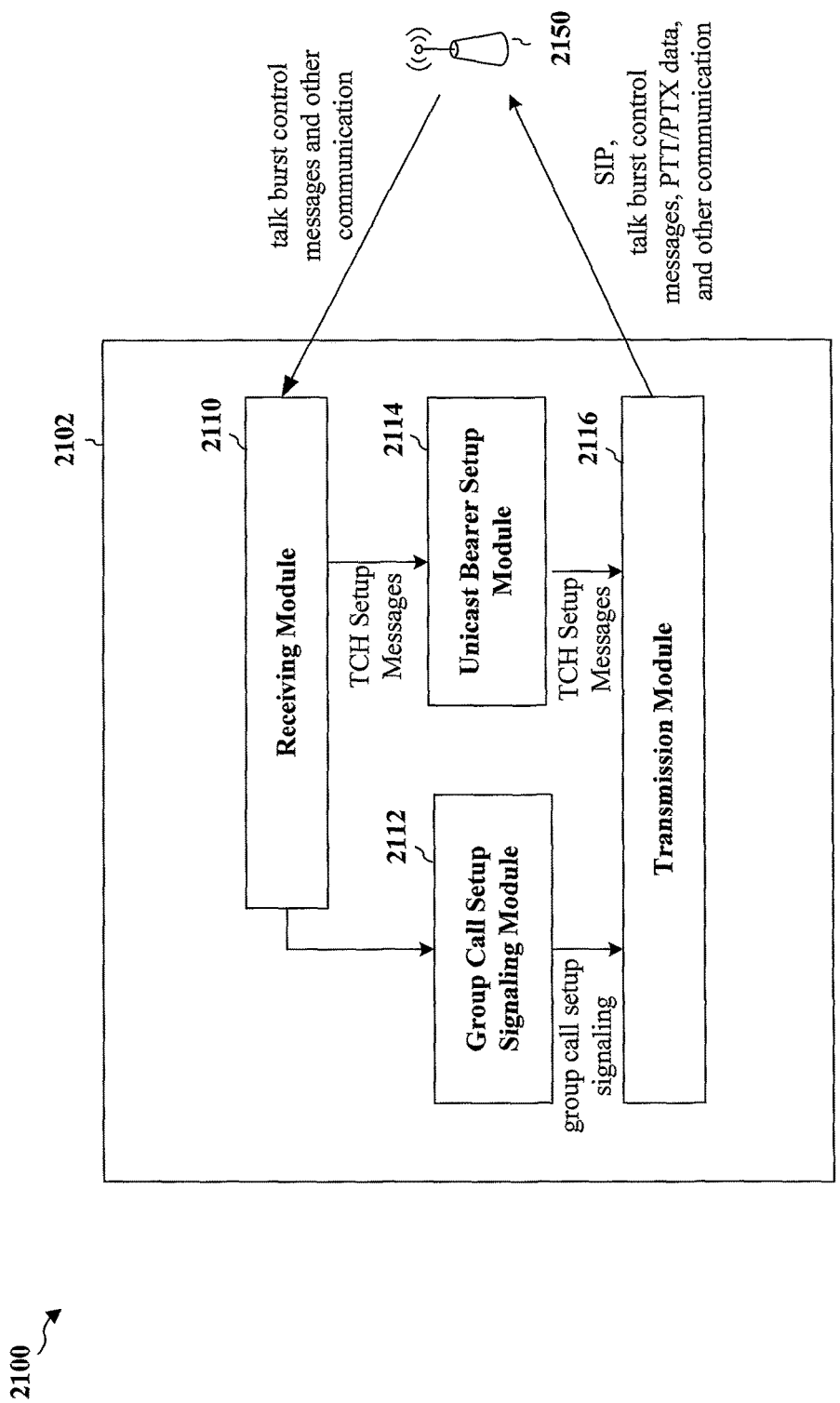
FIG. 21 is a conceptual data flow diagram illustrating the data flow between different modules/means/components in a first exemplary apparatus.

FIG. 21 is a conceptual data flow diagram 2100 illustrating the data flow between different modules/means/components in an exemplary apparatus 2102. The apparatus may be a UE. The UE performs a PTT/PTX call setup for communication via MBMS. The UE includes a unicast bearer setup module 2114 that is configured to set up a unicast bearer with an eNB 2150. The unicast bearer setup module 2114 communicates with a receiving module 2110 and a transmission module 2116 in order to perform the unicast bearer setup. The UE includes a group call setup signaling module 2112 that is configured to send group call setup signaling to the eNB while setting up the unicast bearer.

The apparatus may include additional modules that perform each of the steps of the algorithm in the aforementioned flow chart of FIG. 20 and the diagrams of FIGS. 14-19. As such, each step in the aforementioned figures may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
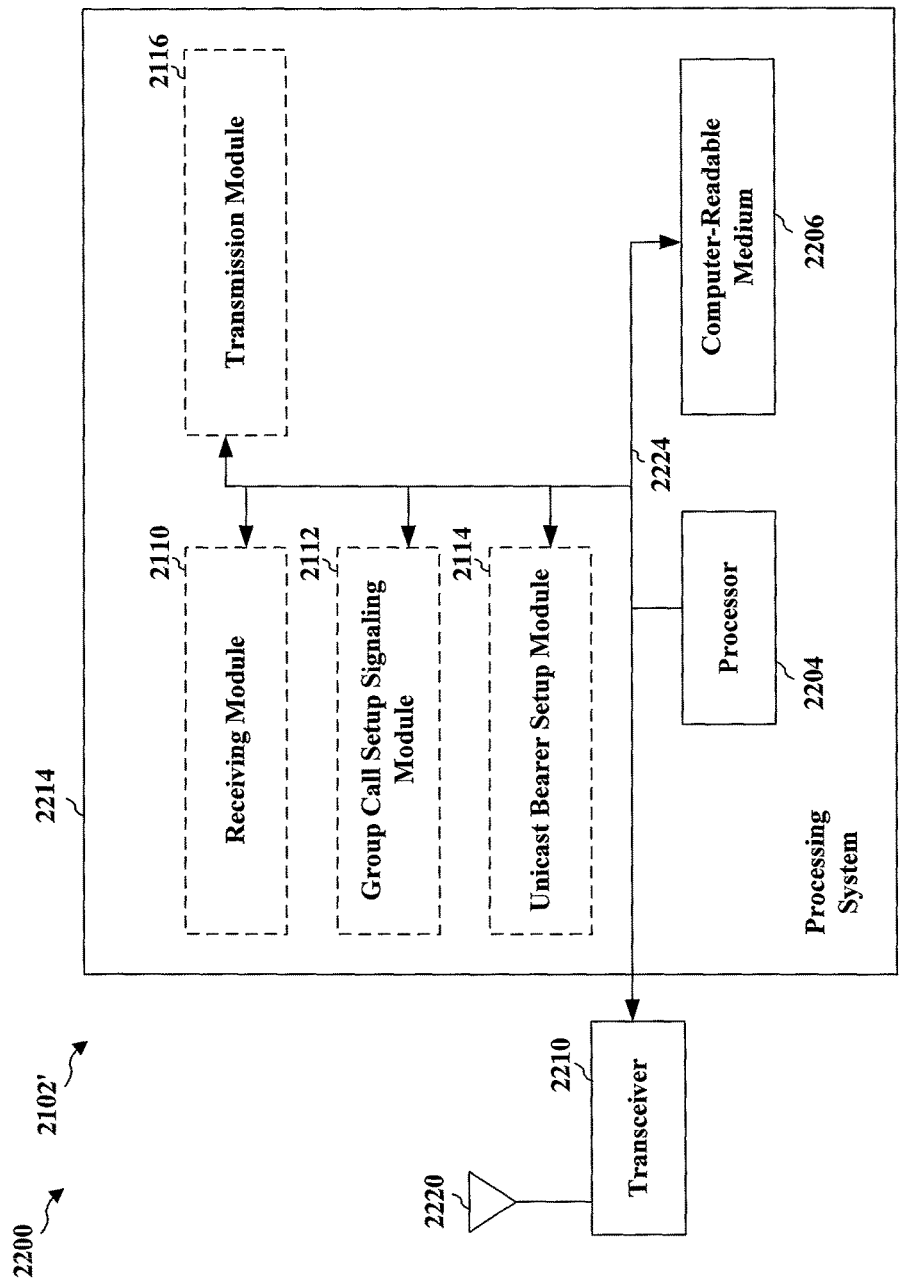
FIG. 22 is a diagram illustrating an example of a hardware implementation for the first exemplary apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2110, 2112, 2114, 2116, and the computer-readable medium 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214. In addition, the transceiver 2210 receives information from the processing system 2214, and based on the received information, generates a signal to be applied to the one or more antennas 2220. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes at least one of the modules 2110, 2112, 2114, 2116. The modules may be software modules running in the processor 2204, resident/stored in the computer readable medium 2206, one or more hardware modules coupled to the processor 2204, or some combination thereof. The processing system 2214 may be a component of the UE 650 and may include the memory 660 and/or at least one of the TX processor 668, the RX processor 656, and the controller/processor 659.

In one configuration, the apparatus 2102/2102' for wireless communication includes means for setting up a unicast bearer with an eNB, and means for sending group call setup signaling to the eNB while setting up the unicast bearer. The apparatus may further include means for receiving a talk burst control message through an MBMS bearer. The apparatus may further include means for sending a first talk burst control message encrypted based on a first set of MTKs, means for receiving a second talk burst control message encrypted based on a second set of MTKs different than the first set of MTKs, and means for sending PTT/PTX data based on a third set of MTKs different than the first set of MTKs and the second set of MTKs. The apparatus may further includes means for sending PTT/PTX data to be transmitted to one or more target UEs over an MBMS bearer. The aforementioned means may be one or more of the aforementioned modules of the apparatus 2102 and/or the processing system 2214 of the apparatus 2102' configured to perform the functions recited by the aforementioned means. As described supra, the processing system 2214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 23:
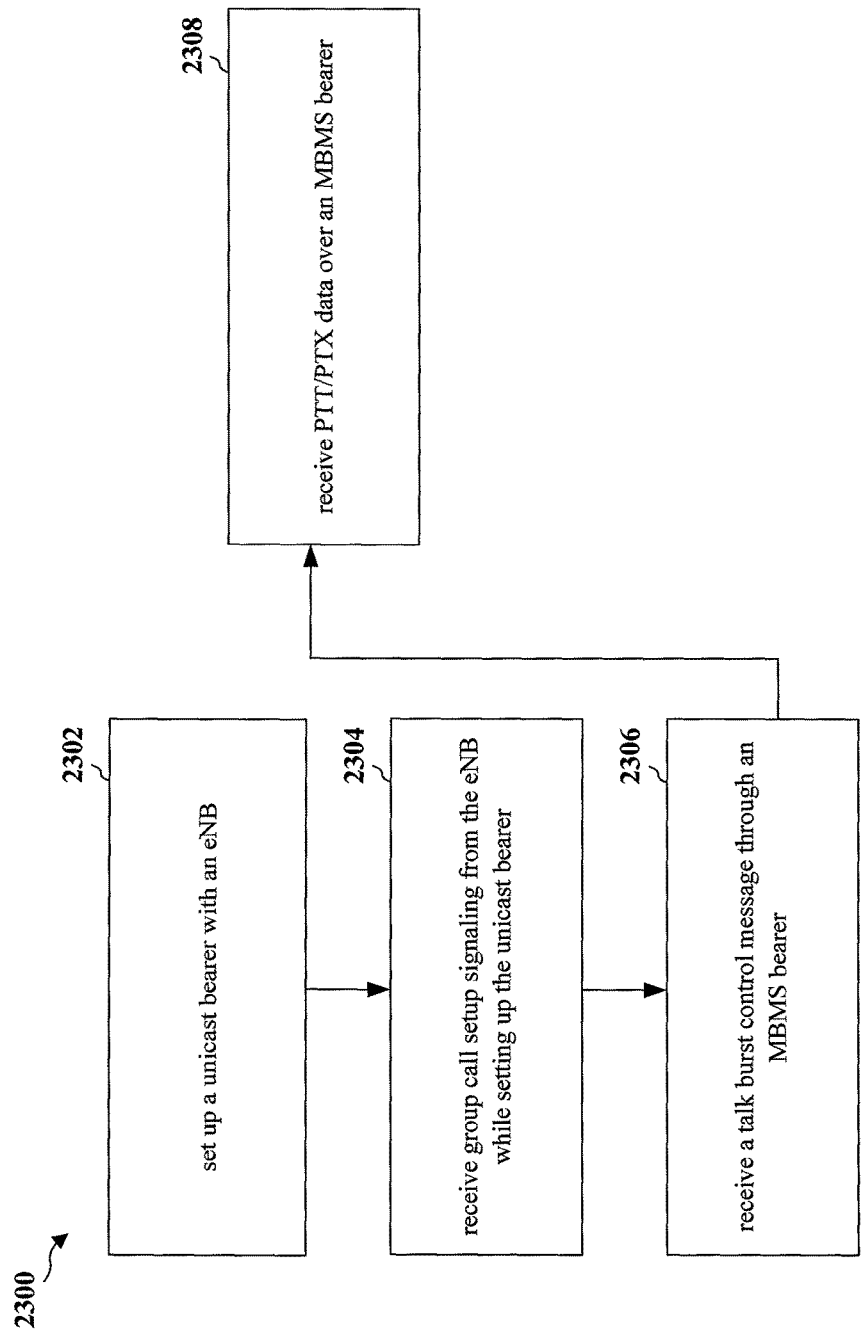
FIG. 23 is a flow chart of a second method of wireless communication.

FIG. 23 is a flow chart 2300 of a method of wireless communication. The method may be performed by a UE. The UE performs a PTT/PTX call setup for communication via MBMS. In step 2302, the UE sets up a unicast bearer with an eNB. In step 2304, the UE receives group call setup signaling from the eNB while setting up the unicast bearer. In step 2306, the UE may receive a talk burst control message through an MBMS bearer. In step 2308, the UE may receive PTT/PTX data over an MBMS bearer.

The group call setup signaling may be service announcement and discovery information for an MBMS bearer. The group call setup signaling may include a SIP invitation request. A UE may set up the unicast bearer by sending an RRC connection request, receiving an RRC connection setup response, and sending an RRC connection complete message. A UE may receive the group call setup signaling with the RRC connection setup response. For example, referring to FIG. 17, the UE 1730 receives a SIP invitation request with an RRC connection setup response.

In step 2306, a UE receives a talk burst control message through an MBMS bearer. The talk burst control message may be at least one of an identity of a user sending the PTT/PTX communication or scheduling information for indicating when PTT/PTX communication is received. A UE may receive the talk burst control message through one of a UDP, a SIP, an HTTP, an FDT instance, or OMA signaling. For example, referring to FIG. 17, the UE 1730 receives a talker identity in talk burst control message.

In one configuration, a session of the MBMS is always on with a preconfigured TMGI or MBMS user service identifier. Referring to FIG. 17, in such a configuration, the MBMS session establish step by the PoC server 1716 and the eMBMS session setup step by the BM-SC 1720 are not performed.

In one configuration, in step 2306, a UE receives a talk burst control message encrypted based on a first set of MTKs. In step 2308, the UE receives PTT/PTX data on an MBMS bearer based on a second set of MTKs different than the first set of MTKs. For example, referring to FIG. 19, the UE 1906 receives a talk burst control message encrypted based on a first set of MTKs including MTK2. The UE receives PTT/PTX data on an MBMS bearer based on a second set of MTKs including MTK3. The second set of MTKs is different than the first set of MTKs. Referring to FIG. 17, the talk burst control message encrypted based on MTK2 may be a talker identity, for example.

Figure 24:
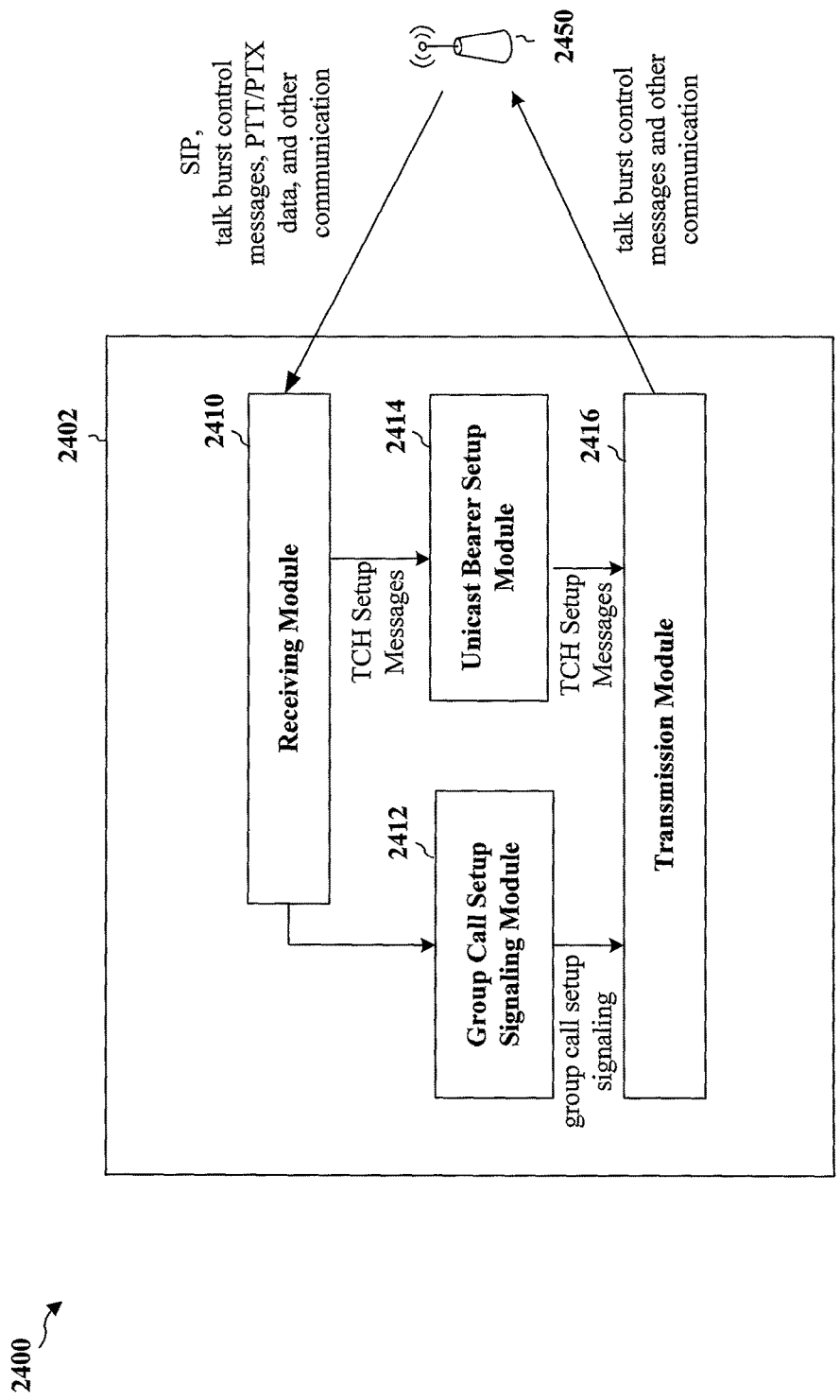
FIG. 24 is a conceptual data flow diagram illustrating the data flow between different modules/means/components in a second exemplary apparatus.

FIG. 24 is a conceptual data flow diagram 2400 illustrating the data flow between different modules/means/components in an exemplary apparatus 2402. The apparatus may be a UE. The UE performs a PTT/PTX call setup for communication via MBMS. The UE includes a unicast bearer setup module 2414 that is configured to set up a unicast bearer with an eNB 2450. The unicast bearer setup module 2414 communicates with a receiving module 2410 and a transmission module 2416 in order to perform the unicast bearer setup. The UE includes a group call setup signaling module 2412 that is configured to receive group call setup signaling from the eNB while setting up the unicast bearer.

The apparatus may include additional modules that perform each of the steps of the algorithm in the aforementioned flow chart of FIG. 23 and the diagrams of FIGS. 14-19. As such, each step in the aforementioned figures may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 25:
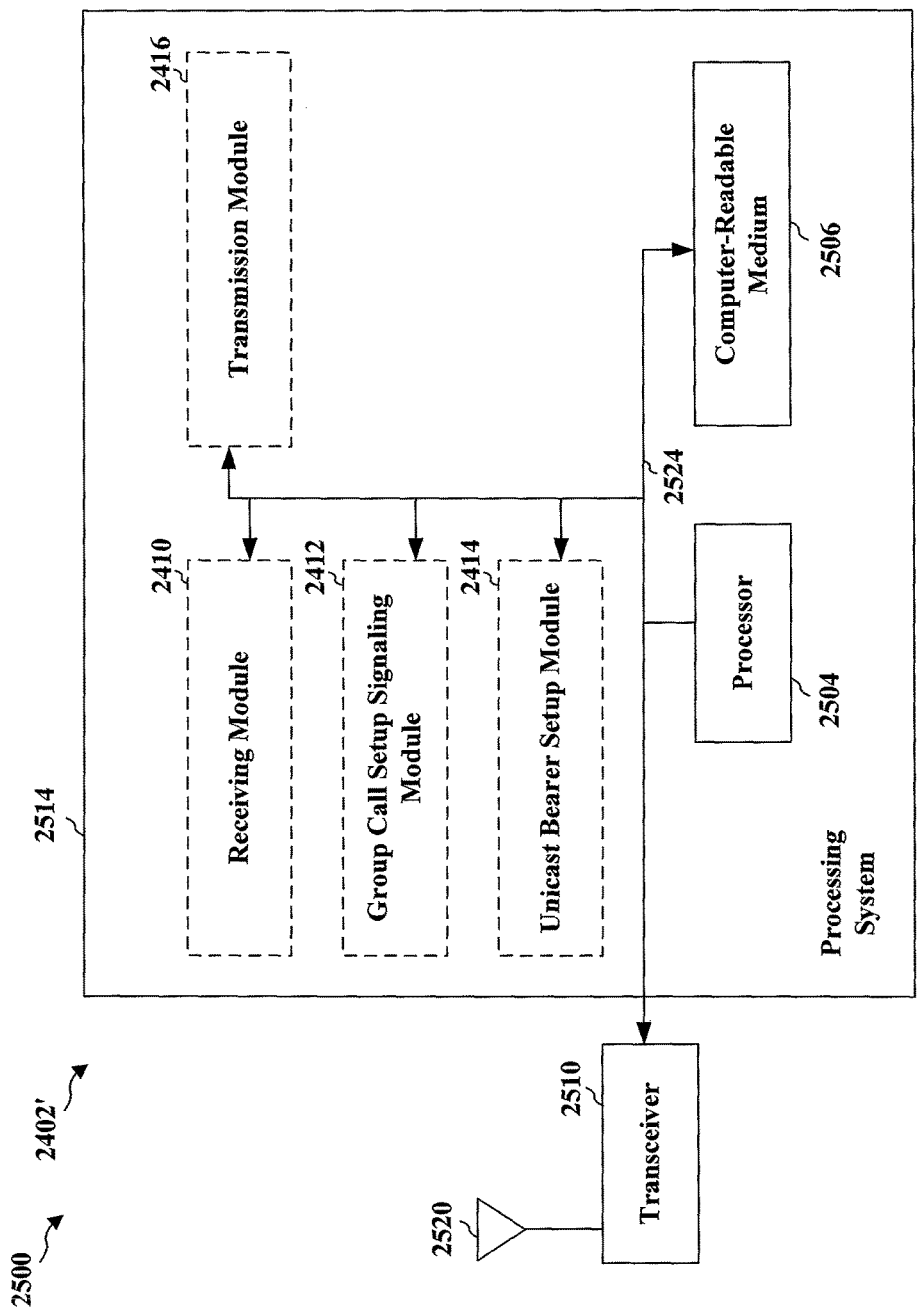
FIG. 25 is a diagram illustrating an example of a hardware implementation for the second exemplary apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2410, 2412, 2414, 2416, and the computer-readable medium 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514. In addition, the transceiver 2510 receives information from the processing system 2514, and based on the received information, generates a signal to be applied to the one or more antennas 2520. The processing system 2514 includes a processor 2504 coupled to a computer-readable medium 2506. The processor 2504 is responsible for general processing, including the execution of software stored on the computer-readable medium 2506. The software, when executed by the processor 2504, causes the processing system 2514 to perform the various functions described supra for any particular apparatus. The computer-readable medium 2506 may also be used for storing data that is manipulated by the processor 2504 when executing software. The processing system further includes at least one of the modules 2410, 2412, 2414, 2416. The modules may be software modules running in the processor 2504, resident/stored in the computer readable medium 2506, one or more hardware modules coupled to the processor 2504, or some combination thereof. The processing system 2514 may be a component of the UE 650 and may include the memory 660 and/or at least one of the TX processor 668, the RX processor 656, and the controller/processor 659.

In one configuration, the apparatus 2402/2402' for wireless communication includes means for setting up a unicast bearer with an eNB, and means for receiving group call setup signaling from the eNB while setting up the unicast bearer. The apparatus may further include means for receiving a talk burst control message through an MBMS bearer. The apparatus may further include means for receiving PTT/PTX data over an MBMS bearer. The apparatus may further include means for receiving a talk burst control message encrypted based on a first set of MTKs, and means for receiving PTT/PTX data on an MBMS bearer based on a second set of MTKs different than the first set of MTKs. The aforementioned means may be one or more of the aforementioned modules of the apparatus 2402 and/or the processing system 2514 of the apparatus 2402' configured to perform the functions recited by the aforementioned means. As described supra, the processing system 2514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 26:
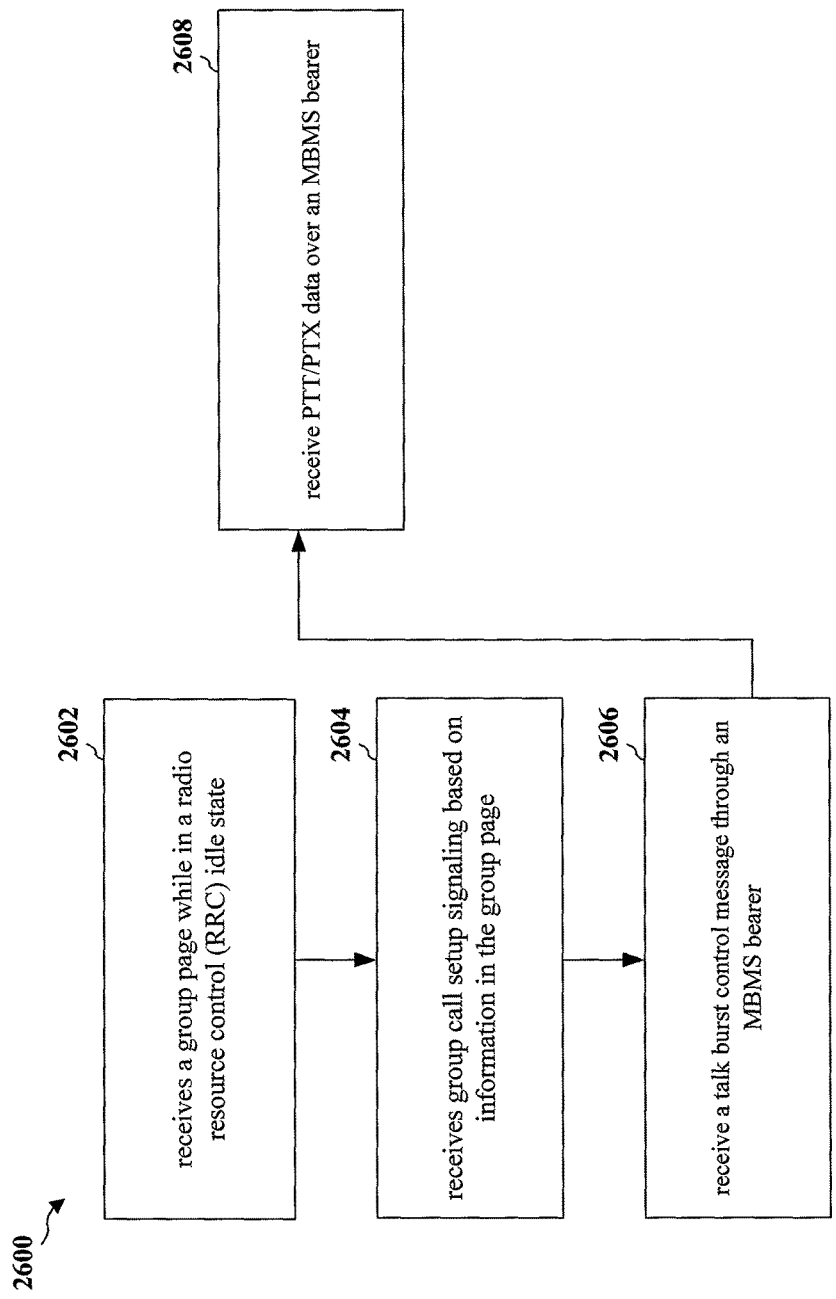
FIG. 26 is a flow chart of a third method of wireless communication.

FIG. 26 is a flow chart 2600 of a method of wireless communication. The method may be performed by a UE. The UE performs a PTT/PTX call setup for communication via MBMS. In step 2602, the UE receives a group page while in an RRC idle state. In step 2604, the UE receives group call setup signaling based on information in the group page. In step 2606, the UE may receive a talk burst control message through an MBMS bearer. In step 2608, the UE may receive PTT/PTX data on an MBMS bearer.

The group page may include a TMGI. If the group page includes a TMGI, the UE may tune to an MBMS bearer corresponding to the TMGI, and then receive the group call setup signaling on the MBMS bearer. The group call setup signaling may include service announcement and discovery information for an MBMS bearer. The service announcement and discovery information may include a security key. The security key may be an MSK protected by an MGK. The group call setup signaling may be received on an MBMS bearer. The group call setup signaling may include a SIP invitation request. For example, referring to FIG. 18, the UEs 1830 receive a group page with a TMGI. The UEs 1830 receive control information on an MCCH, and tune to an MTCH corresponding to the TMGI. The UEs 1830 then receive a SIP on the MTCH. The SIP may include an SDP offer, a TMGI for receiving a PTT/PTX data/media communication, and an MSK protected by an MSG.

In step 2606, the UE receives a talk burst control message through an MBMS bearer. The talk burst control message may include at least one of an identity of a user sending the PTT/PTX communication or scheduling information for indicating when PTT/PTX communication is received. For example, referring to FIG. 18, the talk burst control message includes a talker identity. The talk burst control message may be received through one of a UDP, a SIP, an HTTP, an FDT instance, or OMA signaling.

In one configuration, a session of the MBMS is always on with a preconfigured TMGI or MBMS user service identifier. For example, referring to FIG. 18, if a session of the MBMS is always on, the PoC server 1816 does not perform the MBMS session establish step, and the BM-SC 1818 does not perform the eMBMS session setup step.

In one configuration, in step 2606, a UE may receive a talk burst control message encrypted based on a first set of MTKs. In step 2608, the UE may receive PTT/PTX data on an MBMS bearer based on a second set of MTKs different than the first set of MTKs. For example, referring to FIG. 19, the UE 1906 receives a talk burst control message encrypted based on a first set of MTKs including MTK2. The UE receives PTT/PTX data on an MBMS bearer based on a second set of MTKs including MTK3. The second set of MTKs is different than the first set of MTKs. Referring to FIG. 18, the talk burst control message encrypted based on MTK2 may be a talker identity, for example.

Figure 27:
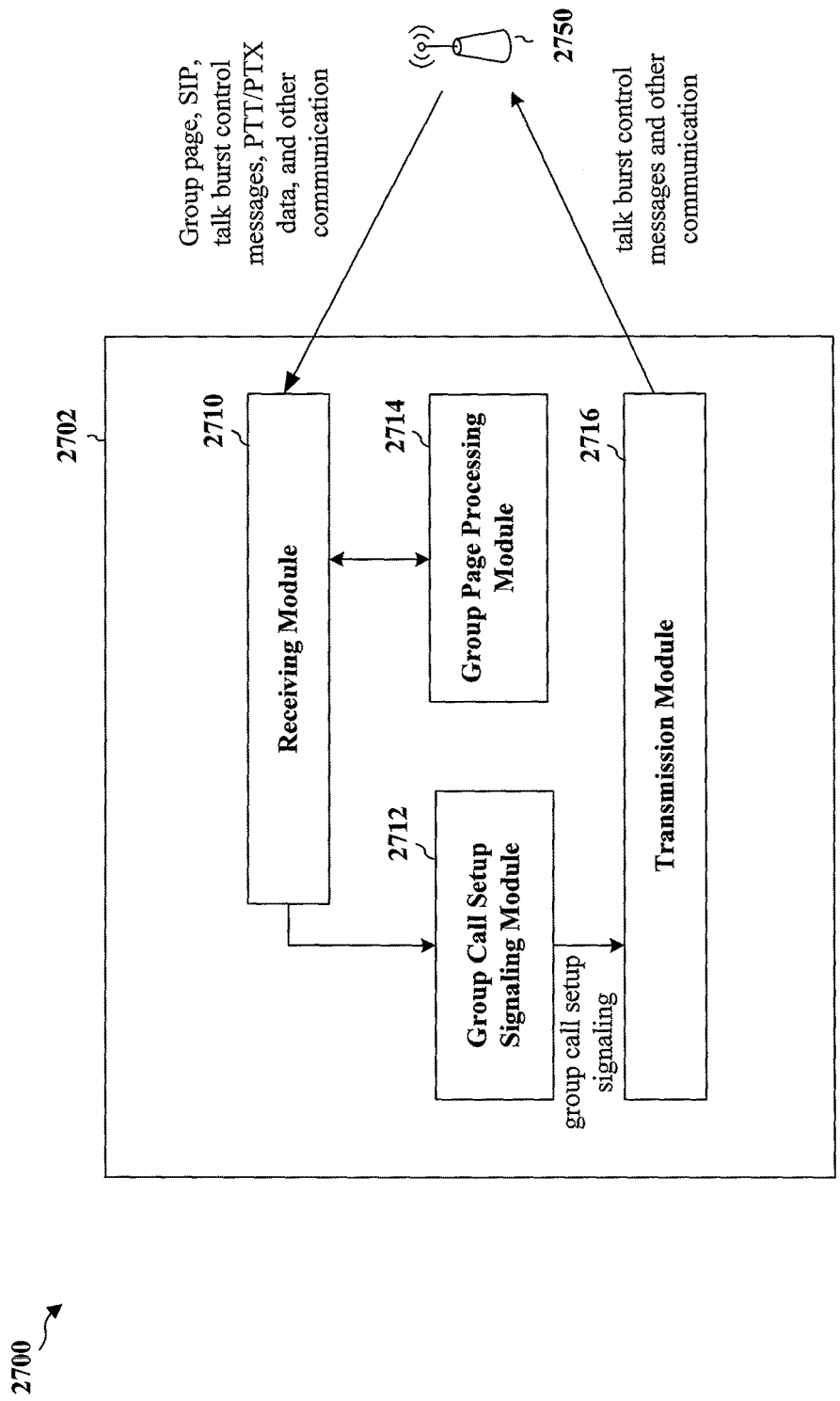
FIG. 27 is a conceptual data flow diagram illustrating the data flow between different modules/means/components in a third exemplary apparatus.

FIG. 27 is a conceptual data flow diagram 2700 illustrating the data flow between different modules/means/components in an exemplary apparatus 2702. The apparatus may be a UE. The UE performs a PTT/PTX call setup for communication via MBMS. The UE includes a group page processing module 2714 that is configured to receive a group page while in an RRC idle state. The group page processing module 2714 configures the receiving module 2710 to receive group call setup signaling through an MBMS bearer from an eNB 2750. The receiving module 2710 is configured to receive group call setup signaling based on information in the group page. The receiving module 2710 provides the group call setup signaling to a group call setup signaling module 2712. The group call setup signaling module 2712 interfaces with a transmission module 2716, which communicates with the eNB 2750.

The apparatus may include additional modules that perform each of the steps of the algorithm in the aforementioned flow chart of FIG. 26 and the diagrams of FIGS. 14-19. As such, each step in the aforementioned figures may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 28:
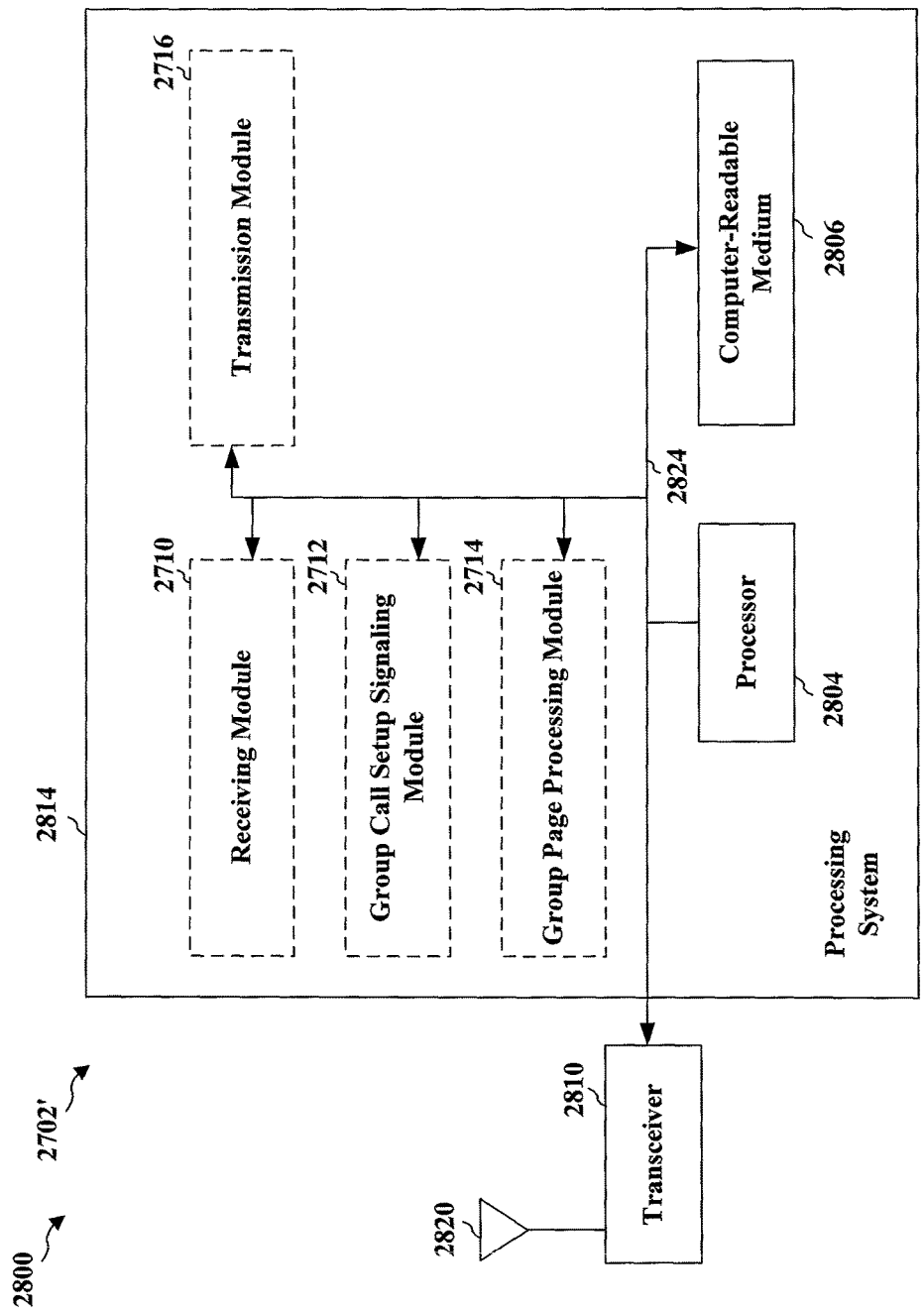
FIG. 28 is a diagram illustrating an example of a hardware implementation for the third exemplary apparatus employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware modules, represented by the processor 2804, the modules 2710, 2712, 2714, 2716, and the computer-readable medium 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The transceiver 2810 receives a signal from the one or more antennas 2820, extracts information from the received signal, and provides the extracted information to the processing system 2814. In addition, the transceiver 2810 receives information from the processing system 2814, and based on the received information, generates a signal to be applied to the one or more antennas 2820. The processing system 2814 includes a processor 2804 coupled to a computer-readable medium 2806. The processor 2804 is responsible for general processing, including the execution of software stored on the computer-readable medium 2806. The software, when executed by the processor 2804, causes the processing system 2814 to perform the various functions described supra for any particular apparatus. The computer-readable medium 2806 may also be used for storing data that is manipulated by the processor 2804 when executing software. The processing system further includes at least one of the modules 2710, 2712, 2714, 2716. The modules may be software modules running in the processor 2804, resident/stored in the computer readable medium 2806, one or more hardware modules coupled to the processor 2804, or some combination thereof. The processing system 2814 may be a component of the UE 650 and may include the memory 660 and/or at least one of the TX processor 668, the RX processor 656, and the controller/processor 659.

In one configuration, the apparatus 2702/2702' for wireless communication includes means for receiving a group page while in an RRC idle state, and means for receiving group call setup signaling based on information in the group page. The apparatus may further include means for tuning to an MBMS bearer corresponding to the TMGI when the group page includes a TMGI. In such a configuration, the group call setup signaling is received on the MBMS bearer. The apparatus may further include means for receiving a talk burst control message through an MBMS bearer. The apparatus may further include means for receiving PTT/PTX data on an MBMS bearer. The apparatus may further include means for receiving a talk burst control message encrypted based on a first set of MTKs, and means for receiving PTT/PTX data on an MBMS bearer based on a second set of MTKs different than the first set of MTKs. The aforementioned means may be one or more of the aforementioned modules of the apparatus 2702 and/or the processing system 2814 of the apparatus 2702' configured to perform the functions recited by the aforementioned means. As described supra, the processing system 2814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 29:
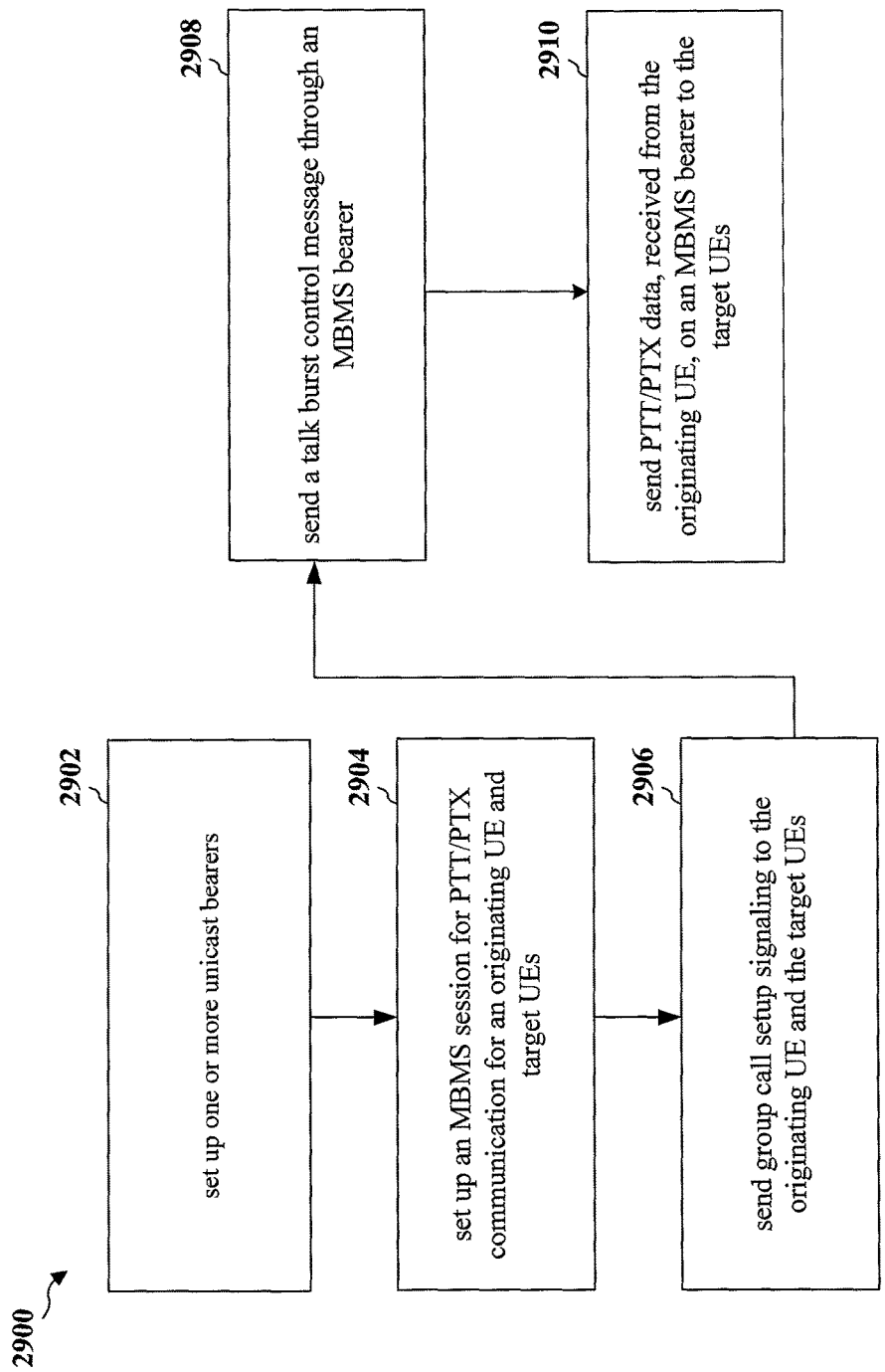
FIG. 29 is a flow chart of a fourth method of wireless communication.

FIG. 29 is a flow chart 2900 of a method of wireless communication. The method may be performed by a network including one or more network entities. The network performs PTT/PTX call setup for communication via MBMS. In step 2902, the network may setup one or more unicast bearers. In step 2904, the network sets up an MBMS session for PTT/PTX communication for an originating UE and two or more target UEs. In step 2906, the network sends group call setup signaling to the originating UE and the target UEs. The group call setup signaling may be sent through a unicast bearer or an MBMS bearer. In step 2908, the network sends a talk burst control message through an MBMS bearer. In step 2910, the network sends PTT/PTX data, received from the originating UE, over an MBMS bearer to the target UEs. For example, referring to FIG. 17, the network sets up unicast bearers for the UEs 1702, 1730. In addition, the network sets up an MBMS session (see MBMS session establish and eMBMS session setup steps) for PTT/PTX communication for the UEs 1702, 1730. In FIG. 17, the group call setup signaling is sent through a unicast bearer to the UE 1730. However, in FIG. 18, the group call setup signaling is sent through an MBMS bearer to the UEs 1830. The network sends talk burst control messages such as a talk burst confirm and talker identity through an MBMS bearer. Furthermore, the network sends PTT/PTX data, received from the UEs 1702, 1802, on an MBMS bearer to the UEs 1730, 1830, respectively.

The network may receive a list of the target UEs for PTT/PTX communication from the originating UE. With respect to adaptive MBSFNs, the network may determine whether a base station should be part of at least one of a multicast broadcast service area or an MBSFN area based on a location of the originating UE and the target UEs. In addition, the network may send to the base station information indicating whether the base station should be part of the at least one of the multicast broadcast service area or the MBSFN area. The network may setup the MBMS session in the at least one of the multicast broadcast service area or the MBSFN area. The network may modify the at least one of the multicast broadcast service area or the MBSFN area based on count information associated with the target UEs. Count information was discussed supra with respect to FIGS. 8-13.

The group call setup signaling may include service announcement and discovery information for an MBMS bearer. The service announcement and discovery information may include a security key. The security key may be an MSK protected by an MGK. The group call setup signaling may include a SIP invitation request. The group call setup signaling may be sent on an MBMS bearer.

The network may set up a unicast bearer with the target UEs by receiving an RRC connection request, sending an RRC connection setup response, and receiving an RRC connection complete message. The group call setup signaling may be sent with the RRC connection setup response. In step 2908, the network may send a talk burst control message through an MBMS bearer. The talk burst control message may include at least one of an identity of a user sending the PTT/PTX communication or scheduling information for indicating when PTT/PTX communication is received. The talk burst control message may include at least one of an indication that PTT/PTX communication can be sent, an indication that PTT/PTX communication cannot be sent, or scheduling information for indicating when PTT/PTX communication can be sent. The talk burst control message may be sent through one of a UDP, a SIP, an HTTP, an FDT instance, or OMA signaling.

In one configuration, a session of the MBMS is always on with a preconfigured TMGI or MBMS user service identifier. If a session of the MBMS is always on, then the MBMS session establish step and the MBMS session setup step of FIGS. 16, 17, and 18 are not performed.

The network may send a group page to the target UEs. The group page may include a TMGI. The network may send the group call setup signaling on an MBMS bearer corresponding to the TMGI. For example, referring to FIG. 18, the the eNB 1828 sends a group page to the UEs 1830. The group page includes a TMGI. The eNB 1828 sends the UEs 1830 group call setup signaling including a SIP on an MBMS bearer corresponding to the TMGI.

In one configuration, the network receives a first talk burst control message from the originating UE. The first talk burst control message is encrypted based on a first set of MTKs. The network sends a second talk burst control message to the originating UE. The second talk burst control message is encrypted based on a second set of MTKs different than the first set of MTKs. The network sends a third talk burst control message to the target UEs. The third talk burst control message is encrypted based on the second set of MTKs. The network receives PTT/PTX data encrypted based on a third set of MTKs different than the first set of MTKs and the second set of MTKs. The network sends the received PTT/PTX data on an MBMS bearer.

Figure 30:
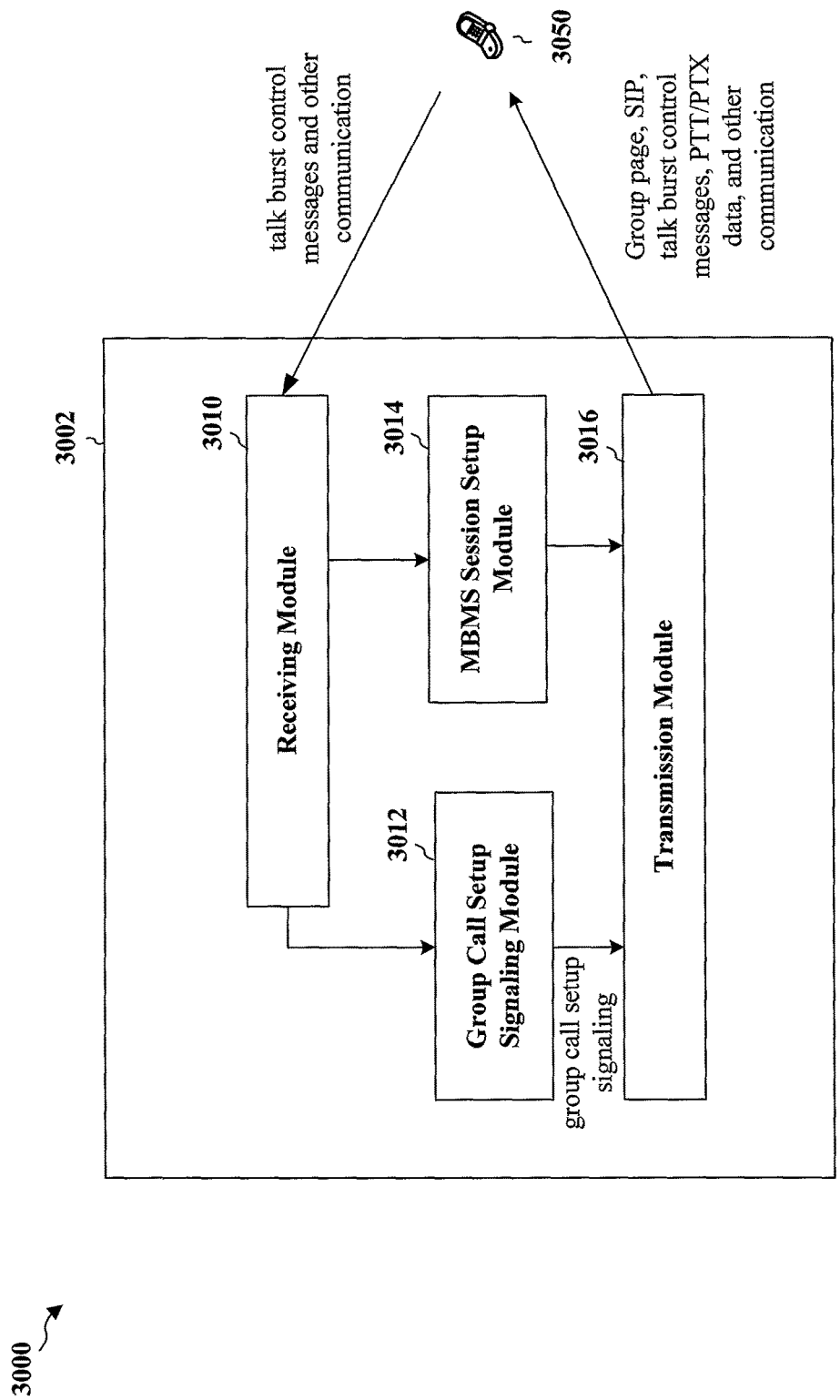
FIG. 30 is a conceptual data flow diagram illustrating the data flow between different modules/means/components in a fourth exemplary apparatus.

FIG. 30 is a conceptual data flow diagram 3000 illustrating the data flow between different modules/means/components in an exemplary apparatus 3002. The apparatus may be a network including one or more network entities. The network includes an MBMS session setup module 3014 that is configured to set up an MBMS session for PTT/PTX communication for an originating UE and target UEs 3050. The MBMS session setup module communicates with a receiving module 3010 and a transmission module 3016 to facilitate the MBMS session setup. The network further includes a group call setup signaling module 3012 that is configured to send group call setup signaling to the originating UE and the target UEs.

The apparatus may include additional modules that perform each of the steps of the algorithm in the aforementioned flow chart of FIG. 29 and the diagrams of FIGS. 8-19. As such, each step in the aforementioned figures may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 31:
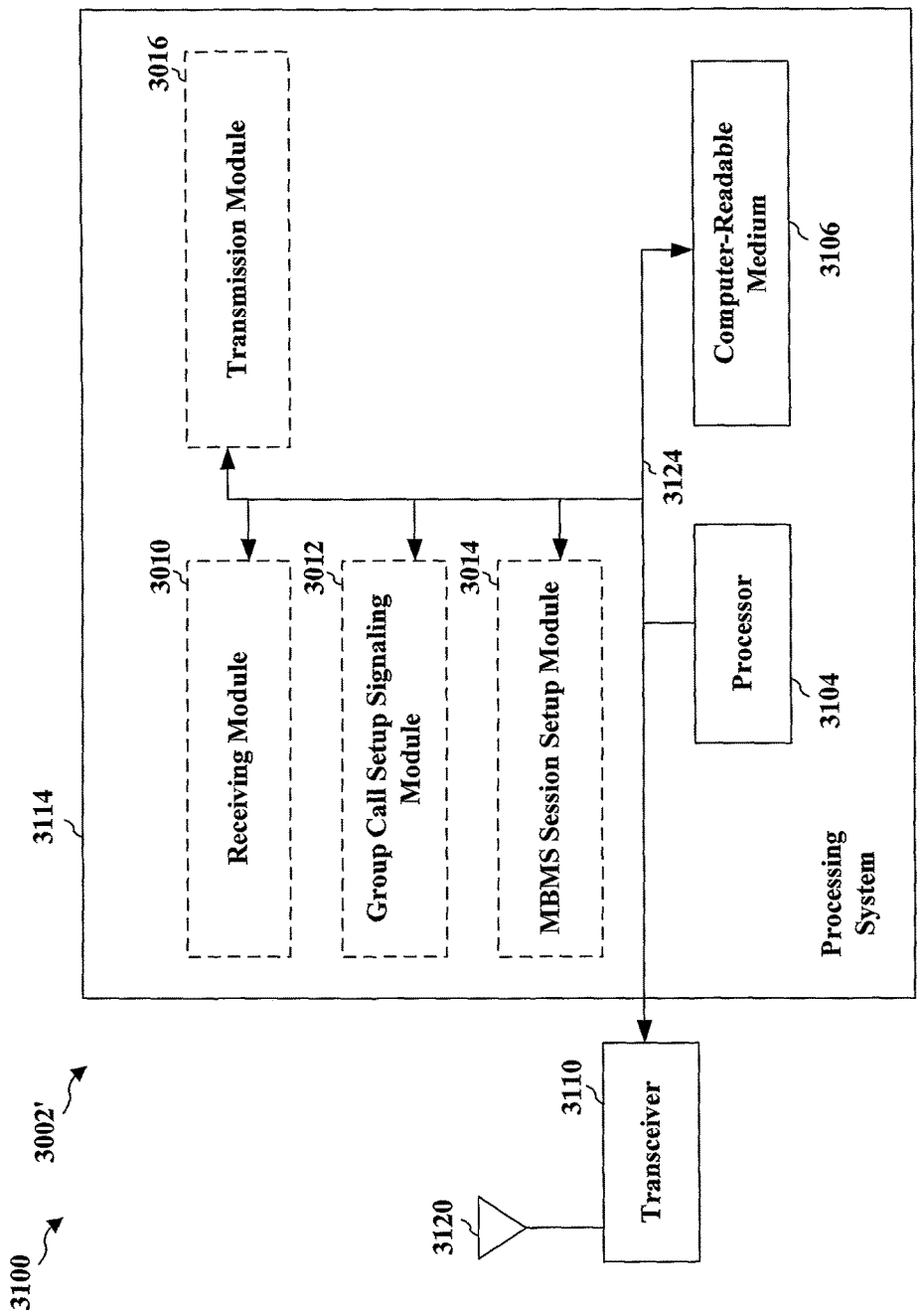
FIG. 31 is a diagram illustrating an example of a hardware implementation for the fourth exemplary apparatus employing a processing system.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware modules, represented by the processor 3104, the modules 3010, 3012, 3014, 3016, and the computer-readable medium 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114. In addition, the transceiver 3110 receives information from the processing system 3114, and based on the received information, generates a signal to be applied to the one or more antennas 3120. The processing system 3114 includes a processor 3104 coupled to a computer-readable medium 3106. The processor 3104 is responsible for general processing, including the execution of software stored on the computer-readable medium 3106. The software, when executed by the processor 3104, causes the processing system 3114 to perform the various functions described supra for any particular apparatus. The computer-readable medium 3106 may also be used for storing data that is manipulated by the processor 3104 when executing software. The processing system further includes at least one of the modules 3010, 3012, 3014, 3016. The modules may be software modules running in the processor 3104, resident/stored in the computer readable medium 3106, one or more hardware modules coupled to the processor 3104, or some combination thereof.

In one configuration, the apparatus 3002/3002' for wireless communication includes means for setting up an MBMS session for PTT/PTX communication for an originating UE and target UEs, and means for sending group call setup signaling to the originating UE and the target UEs. The apparatus may further include means for receiving a list of the target UEs for PTT/PTX communication from the originating UE. The apparatus may further include means for determining whether a base station should be part of at least one of a multicast broadcast service area or an MBSFN area based on a location of the originating UE and the target UEs. The apparatus may further include means for sending to the base station information indicating whether the base station should be part of the at least one of the multicast broadcast service area or the MBSFN area. The MBMS session may be set up in the at least one of the multicast broadcast service area or the MBSFN area. The apparatus may further include means for modifying the at least one of the multicast broadcast service area or the MBSFN area based on count information associated with the target UEs. The apparatus may further include means for setting up a unicast bearer with the target UEs by receiving an RRC connection request, sending an RRC connection setup response, and receiving an RRC connection complete message. The group call setup signaling may be sent with the RRC connection setup response. The apparatus may further include means for sending a talk burst control message through an MBMS bearer. The apparatus may further include means for sending PTT/PTX data, received from the originating UE, on an MBMS bearer to the target UEs. The apparatus may further include means for sending a talk burst control message encrypted based on a first set of MTKs, and means for sending PTT/PTX data over MBMS based on a second set of MTKs different than the first set of MTKs. The apparatus may further include mean for sending a group page to the target UEs. The apparatus may further include means for receiving a first talk burst control message from the originating UE. The first talk burst control message may be encrypted based on a first set of MTKs. The apparatus may further include means for sending a second talk burst control message to the originating UE. The second talk burst control message may be encrypted based on a second set of MTKs different than the first set of MTKs. The apparatus may further include means for sending a third talk burst control message to the target UEs. The third talk burst control message may be encrypted based on the second set of MTKs. The apparatus may further include means for receiving PTT/PTX data encrypted based on a third set of MTKs different than the first set of MTKs and the second set of MTKs. The apparatus may further include means for sending the received PTT/PTX data on an MBMS bearer. The aforementioned means may be one or more of the aforementioned modules of the apparatus 3002 and/or the processing system 3114 of the apparatus 3002' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE), comprising:
   determining group identifying information that identifies a given Multimedia Broadcast Multicast Service (MBMS) group to which the UE is registered, the given MBMS group being supported by a MBMS session that is maintained while the MBMS session is not being used to support any group calls associated with the given MBMS group;
   receiving a group page for a given group call with the given MBMS group that includes the group identifying information that identifies the given MBMS group;
   setting up the given group call in response to the group page over the MBMS session based on the group identifying information;
   obtaining a first set of MBMS traffic keys (MTKs) for encrypting control data that is exchanged between the UE and a network component after the UE has joined the given group call while the given group call is in progress; and
   obtaining a second set of MTKs for encrypting media to be transmitted by the UE during the given group call.

2. The method of claim 1, wherein the group identifying information includes a group identifier (ID) for the given MBMS group, a temporary mobile group identity (TMGI) for the given MBMS group and/or a MBMS user service ID for the given MBMS group.

3. The method of claim 2, wherein the group identifying information includes the TMGI for the given MBMS group.

4. The method of claim 2, wherein the group identifying information includes the MBMS user service ID for the given MBMS group.

5. The method of claim 1, wherein resources supporting the MBMS session are allocated to unicast traffic when the MBMS session is not being used to support any group calls associated with the given MBMS group.

6. The method of claim 1, wherein the MBMS session is an Always-On MBMS session.

7. The method of claim 1, wherein setting up the given group call includes:
   tuning to an MBMS bearer or multicast traffic channel (MTCH) corresponding to the group identifying information to receive media for the given group call.

8. The method of claim 1, wherein the given group call is a push to talk (PTT) or push to everything (PTX) call.

9. The method of claim 1, wherein the obtaining of the second set of MTKs includes:
   generating the second set of MTKs at the UE.

10. The method of claim 1, wherein the obtaining of the first set of MTKs includes:
    receiving the first set of MTKs at the UE from a remote server.

11. The method of claim 10, wherein the remote server is a PTT over cellular (PoC) server or a Broadcast Multicast Service Center (BM-SC).

12. The method of claim 1, further comprising:
    sending a first talk burst control message for the given group call encrypted based on the first set of MTKs;
    receiving a second talk burst control message for the given group call encrypted based on a third set of MTKs different than the first set of MTKs; and
    sending media for the given group call based on the second set of MTKs different than the first set of MTKs and the third set of MTKs.

13. The method of claim 12,
    wherein the first set of MTKs is generated by the UE,
    wherein the third set of MTKs is generated by another UE participating in the given group call, and
    wherein the second set of MTKs is generated by a remote server.

14. The method of claim 13, wherein the remote server is a PTT over cellular (PoC) server or a Broadcast Multicast Service Center (BM-SC).

15. The method of claim 1, wherein the UE is in a Radio Resource Control (RRC) Idle state when the group page is received.

16. A method of operating a network component, comprising:
    transmitting, to one or more target user equipments (UE) that are registered to a given Multimedia Broadcast Multicast Service (MBMS) group, a group page for a given group call with the given MBMS group that includes group identifying information that identifies the given MBMS group, the given MBMS group being supported by a MBMS session that is maintained while the MBMS session is not being used to support any group calls associated with the given MBMS group;
    setting up the given group call over the MBMS session; and
    transmitting control data and call media over an MBMS bearer or multicast traffic channel (MTCH) corresponding to the group identifying information,
    wherein the control data is exchanged between the one or more target UEs and the network component after the one or more target UEs have joined the given group call while the given group call is in progress, and is encrypted by a first set of MBMS traffic keys (MTKs), and
    wherein the call media is encrypted by a second set of MTKs.

17. The method of claim 16, wherein the component is an enhanced Node B (eNB) of an access network.

18. The method of claim 16, wherein the group identifying information includes a group identifier (ID) for the given MBMS group, a temporary mobile group identity (TMGI) for the given MBMS group and/or a MBMS user service ID for the given MBMS group.

19. The method of claim 18, wherein the group identifying information includes the TMGI for the given MBMS group.

20. The method of claim 18, wherein the group identifying information includes the MBMS user service ID for the given MBMS group.

21. The method of claim 16, wherein resources supporting the MBMS session are allocated to unicast traffic when the MBMS session is not being used to support any group calls associated with the given MBMS group.

22. The method of claim 16, wherein the MBMS session is an Always-On MBMS session.

23. The method of claim 16, wherein the given group call is a push to talk (PTT) or push to everything (PTX) call.

24. A user equipment (UE), comprising:
a processor coupled to memory and configured to:
  determine group identifying information that identifies a given Multimedia Broadcast Multicast Service (MBMS) group to which the UE is registered, the given MBMS group being supported by a MBMS session that is maintained while the MBMS session is not being used to support any group calls associated with the given MBMS group;
  receive a group page for a given group call with the given MBMS group that includes the group identifying information that identifies the given MBMS group;
  set up the given group call in response to the group page over the MBMS session based on the group identifying information;
  obtain a first set of MBMS traffic keys (MTKs) for encrypting control data that is exchanged between the UE and a network component after the UE has joined the given group call while the given group call is in progress; and
  obtain a second set of MTKs for encrypting media to be transmitted by the UE during the given group call.

25. A network component, comprising:
a processor coupled to memory and configured to:
  transmit, to one or more target user equipments (UE) that are registered to a given Multimedia Broadcast Multicast Service (MBMS) group, a group page for a given group call with the given MBMS group that includes group identifying information that identifies the given MBMS group, the given MBMS group being supported by a MBMS session that is maintained while the MBMS session is not being used to support any group calls associated with the given MBMS group;
  set up the given group call over the MBMS session; and
  transmit control data and call media over an MBMS bearer or multicast traffic channel (MTCH) corresponding to the group identifying information,
  wherein the control data is exchanged between the one or more target UEs and the network component after the one or more target UEs have joined the given group call while the given group call is in progress, and is encrypted by a first set of MBMS traffic keys (MTKs), and
  wherein the call media is encrypted by a second set of MTKs.

26. The component of claim 25, wherein the network component is an enhanced Node B (eNB) of an access network.

* * * * *